(12) United States Patent
Sahagun et al.

(10) Patent No.: US 10,797,883 B2
(45) Date of Patent: Oct. 6, 2020

(54) DEPLOYING MULTIPLE NODES FOR CREATION OF BLOCKCHAINS FOR TRACKABLE ACTIONS

(71) Applicant: KYOCERA Document Solutions Inc., Osaka (JP)

(72) Inventors: Allan Sahagun, Oakland, CA (US); Sandra da Silva, San Francisco, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 268 days.

(21) Appl. No.: 15/908,634

(22) Filed: Feb. 28, 2018

(65) Prior Publication Data

US 2019/0268162 A1    Aug. 29, 2019

(51) Int. Cl.
| H04L 29/06 | (2006.01) |
| H04L 9/32 | (2006.01) |
| G06F 16/248 | (2019.01) |
| G06F 16/2455 | (2019.01) |
| G06Q 10/10 | (2012.01) |

(52) U.S. Cl.
CPC .......... *H04L 9/3236* (2013.01); *G06F 16/248* (2019.01); *G06F 16/2455* (2019.01); *H04L 63/0442* (2013.01); *G06Q 10/1091* (2013.01); *H04L 2209/38* (2013.01)

(58) Field of Classification Search
CPC ............... H04L 9/3236; H04L 63/0442; H04L 2209/38; H04L 67/22; H04L 63/101; G06F 16/248; G06F 16/2455; G06F 16/9024; G06Q 10/1091
See application file for complete search history.

(56) References Cited

U.S. PATENT DOCUMENTS

| 2016/0342977 A1* | 11/2016 | Lam ...................... G06Q 20/02 |
| 2018/0178451 A1* | 6/2018 | Gosch ................... G06F 21/608 |
| 2018/0204192 A1* | 7/2018 | Whaley ............. G06Q 20/0658 |
| 2018/0253702 A1* | 9/2018 | Dowding ............... G06Q 20/06 |

(Continued)

OTHER PUBLICATIONS

Kiayias et al., "Traitor Deterring Schemes: Using Bitcoin as Collateral for Digital Content", Publication:CCS '15: Proceedings of the 22nd ACM SIGSAC Conference on Computer and Communications, Oct. 2015.*

(Continued)

*Primary Examiner* — Morshed Mehedi
(74) *Attorney, Agent, or Firm* — McDonnell Boehnen Hulbert & Berghoff LLP

(57) ABSTRACT

Methods and apparatus for storing trackable actions in a ledger are provided. A computing device acting as a node can receive a notification of a trackable action. The trackable action can relate to a printer-related transaction and/or an entry-or-exit transaction. The node can generate a block hash value using a hash function operating on data that includes at least part of the notification. The node can add a new block to a ledger, the new block including: the block hash value, a reference to a previous-block hash value of a previous block in the ledger, and the data that includes at least part of the notification of the trackable action. The node can receive a query related to the ledger. In response to the query, the node can provide an output that includes information about the trackable action.

18 Claims, 10 Drawing Sheets

(56) References Cited

U.S. PATENT DOCUMENTS

| | | | |
|---|---|---|---|
| 2018/0257306 A1* | 9/2018 | Mattingly | H04L 9/3236 |
| 2019/0096522 A1* | 3/2019 | Scriber | H04L 9/30 |
| 2019/0102736 A1* | 4/2019 | Hudson | G06Q 10/0875 |
| 2019/0253256 A1* | 8/2019 | Saab | H04L 9/0637 |
| 2019/0287095 A1* | 9/2019 | Gaddam | G06Q 20/356 |

OTHER PUBLICATIONS

A. M. Antonopoulos, The Blockchain, Chapter 7 of Mastering Bitcoin, Version 1, Dec. 20, 2014, available at chimera.labs.oreilly.com/books/1234000001802/ch07.html.
Blockchain Technologies, Blockchain Technology Explained, Nov. 14, 2017, available at www.blockchaintechnologies.com/blockchain-definition.
Wikimedia Foundation, Blockchain, Nov. 15, 2017, available at en.wikipedia.org/w/index.php?title=Blockchain&oldid=810512431.
Wikimedia Foundation, Merkle tree, Nov. 10, 2017, available at en.wikipedia.org/w/index.php?title=Merkle_tree&oldid=809682166.
Wikimedia Foundation, Secure Hash Algorithms, Nov. 25, 2017, available at en.wikipedia.org/w/index.php?title=Secure_Hash_Algorithms&oldid=812014541.

* cited by examiner

DEPLOYING MULTIPLE NODES FOR CREATION OF BLOCKCHAINS FOR TRACKABLE ACTIONS

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. Some or all of the printing devices can generate log files to record operations performed using the printing devices, such as printing operations, scanning operations, and document communication operations.

SUMMARY

In one aspect, a method is provided. A node receives a notification of a trackable action. The trackable action relates to one or more of a printer-related transaction and an entry-or-exit transaction. The node generates a block hash value using a hash function operating on data that includes at least part of the notification of the trackable action. The node adds a new block to a ledger of trackable actions. The new block includes the block hash value, a reference to a previous-block hash value of a previous block in the ledger of trackable actions, and the data that includes at least part of the notification of the trackable action. The node receives a query related to the ledger of trackable actions. In response to the query, the node providing an output that including information about the trackable action.

In another aspect, a node is provided. The node includes one or more processors and data storage. The data storage is configured to store computer-readable instructions that, when executed by the one or more processors, cause the node to perform tasks. The tasks include: receiving a notification of a trackable action that relates to one or more of: a printer-related transaction and an entry-or-exit transaction; generating a block hash value using a hash function operating on data that includes at least part of the notification of the trackable action; adding a new block to a ledger of trackable actions, the new block including: the block hash value, a reference to a previous-block hash value of a previous block in the ledger of trackable actions, and the data that includes at least part of the notification of the trackable action; receiving a query related to the ledger of trackable actions; and in response to the query, providing an output including information about the trackable action.

In another aspect, an article of manufacture is provided. The article of manufacture includes non-transitory data storage storing at least computer-readable instructions for a node that, when executed by one or more processors of a node, cause the node to perform tasks. The tasks include: receiving a notification of a trackable action that relates to one or more of: a printer-related transaction and an entry-or-exit transaction; generating a block hash value using a hash function operating on data that includes at least part of the notification of the trackable action; adding a new block to a ledger of trackable actions, the new block including: the block hash value, a reference to a previous-block hash value of a previous block in the ledger of trackable actions, and the data that includes at least part of the notification of the trackable action; receiving a query related to the ledger of trackable actions; and in response to the query, providing an output including information about the trackable action.

Other aspects, embodiments, and implementations will become apparent to those of ordinary skill in the art by reading the following detailed description, with reference where appropriate to the accompanying drawings.

DETAILED DESCRIPTION

Figure 1:
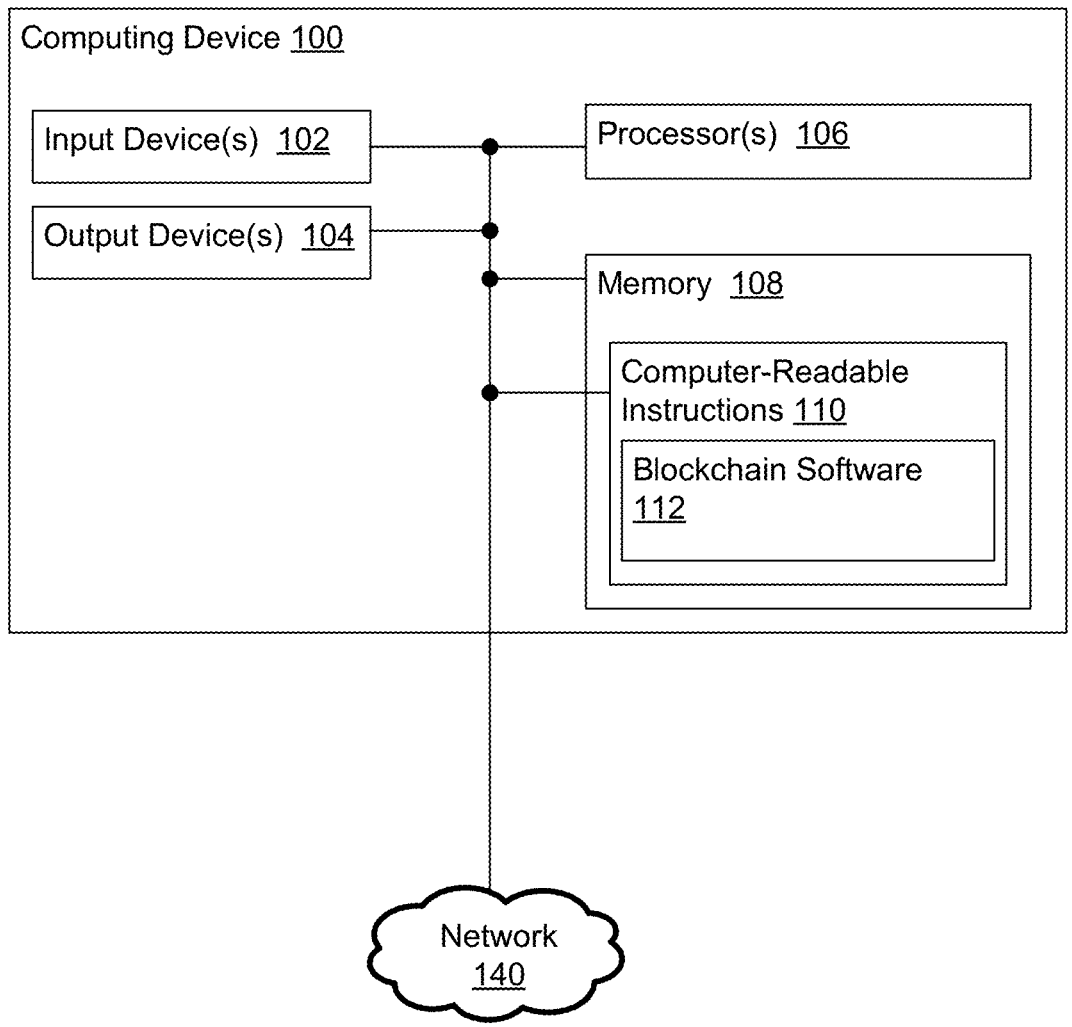
FIG. 1 is a schematic block diagram illustrating a computing device, in accordance with at least some example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Herein are described techniques and systems for generating, maintaining, and utilizing a distributed ledger system that keeps an accurate and secure record of trackable actions performed on networked devices, such as one or more printing devices. A trackable action can include a record of an action associated with job and/or other accounting, such as an action associated with building entry, building exit, clocking in; i.e., recording a start time of a person or other entity at work; clocking out; i.e., recording an ending time of a person or other entity at work, a print job, a scan job, communication of a document, etc.

For example, a distributed ledger system can store trackable actions related to employees clocking in and out, and then can later be used to retrieve those trackable actions for various purposes; e.g., verify employee attendance, payroll, etc. In particular, a trackable action can be generated to clock in (or clock out) an employee of an organization who has a badge storing data, including identification information for the employee. When the employee's badge is read by a badge-reading device, such as a building entry device with a near-field communication (NFC) reader, a printing device such as a multi-functional printer (MFP), or another device, the employee can clock in (or clock out), and a corresponding trackable action can be generated by the badge-reading device.

Some or all of the data of a distributed ledger system can be encrypted. The encrypted data can be encrypted by using one or more cryptographic keys. The cryptographic key(s) can include one or more public keys, private keys, and/or other types of cryptographic keys. Some cryptographic keys can be used alone; e.g., a symmetric key, while other cryptographic keys are used in pairs or other groupings. For example, a public/private key pair of cryptographic keys can include a private key and a public key, where data encrypted using the private key can be decrypted using the public key (and vice versa). In some cases, the public key of a public/private key pair may be distributed (widely) to others, while the private key may not be distributed to others, thus maintaining the privacy of the private key. In other examples, a public/private key pair can be used to perform other cryptographic operations than encryption/decryption; e.g., generating a digital signature, generating cryptographic hash values.

In some cases, the badge-reading device. can read a private key for the employee's badge, generate a clock in (or clock out) trackable action with the current time, and add the trackable action, perhaps signed with the employee's private key, to a secure distributed ledger. A key register, or list of cryptographic keys, such as employee public keys, can be used to retrieve employees' clock in/out information from the ledger at a later time.

To operate a distributed ledger, one or more networked devices can be identified; e.g., by registering with a fleet management system, as devices that are eligible for operating on the distributed ledger. A group of identified devices can communicate with other identified devices to operate on the distributed ledger, where a copy of the distributed ledger can be stored locally on each identified device; e.g., on a hard disk or other persistent storage of the identified device.

In some cases, trackable actions could be stored and accessed using a centralized ledger rather than a distributed ledger. However, use of a centralized ledger system is not the most convenient method for some organizations (e.g., large organizations such as governments and multinational corporations/conglomerates) that may have multiple departmental and/or corporate identities within the organization. Rather, in such a multi-departmental environment, a distributed ledger maintained on a per-department or per-corporate-identity basis can be more convenient, as use of such as distributed ledger would allow for greater transparency within a department/corporate identity and across departments/corporate identities with possible benefits including the elimination of duplicated efforts and the consolidation of budgets.

To add data about trackable actions to the distributed ledger, a trackable action can be generated by one computing device or "node" and broadcast to one or more other devices associated with a distributed ledger; e.g., a node can be a printing device, a server, a door entry/exit system, or another computing device. Then, each of the other devices can store the trackable action in the distributed ledger. In other examples where a user is associated with multiple organizations O1, O2, . . . , device DEV1 can be used to broadcast a trackable action to multiple sets of devices, with one set of devices is associated with one of the multiple organizations O1, O2, . . . so that each set of devices can update one or more distributed registers associated with a corresponding organization. The distributed ledger can then be copied or distributed across the set of devices and verified accordingly, allowing the set of devices to provide real time information about trackable actions.

The distributed ledger can be secured using blockchain technology. Blockchain technology can involve operations performed upon a list of records; e.g., records of trackable actions, or "blocks" that are linked together to form a "blockchain". As described herein, a blockchain for a distributed ledger can includes two types of records: records for trackable actions and records for blocks. For example, records of trackable actions stored in a block of the distributed ledgers can be hashed and encoded using a suitable data structure; e.g., a Merkle tree. A Merkle tree or hash tree is a tree whose leaf nodes have labels associated with blocks of trackable actions and whose non-leaf nodes are labeled with a cryptographic hash of labels of its child nodes. A block is either an origin block originating the blockchain or a block that includes a hash of a parent block prior to the block in the blockchain—this hash links the block with the parent block, which in turn is linked to another parent block, and so on back to the origin block. In some case, an origin block can be termed as a genesis block. As all blocks but the origin block include a hash of a parent block, to modify the data of a block would involve modifying the hash value stored in a later block which in turn would modify the hash value of an even later block and so on. Thus, by use of blocks chained by hash values of prior blocks, the blockchain can be secured from tampering; i.e., once a block of data is recorded in the distributed ledger, the data in the recorded block cannot be altered without alteration of all subsequent blocks.

A distributed ledger can be implemented using blockchains. Like the distributed ledger, a blockchain can be distributed between multiple devices or nodes. As such, a distributed blockchain can act as a distributed ledger stored in the blocks of the blockchain. In some examples, the nodes associated with the distributed ledger can be organized as a peer-to-peer network that use a common protocol for generating, communicating, and validating new blocks in the blockchain for the distributed ledger.

A fleet management system can be used to register devices for creating, utilizing, maintaining, and/or operating a distributed ledger. For example, a system administrator or other entity can register one or more devices for creating, utilizing, maintaining, and/or operating one or more distributed ledgers for a sub-organization, such a department or corporate identity, of a larger organization, such as a government or corporation. Some of the distributed ledgers can be shared across multiple sub-organizations and/or an entire larger organization.

To register a device for creating, utilizing, maintaining, and/or operating one or more distributed ledgers, the fleet management system can create a universal unique identifier (UUID) or other identifier for each sub-organization and/or organization that wants to enroll its devices in job accounting; i.e., enroll a device for creating, utilizing, maintaining, and/or operating one or more distributed ledgers. In some cases, UUIDs and/or other identifiers can be associated with other entities than sub-organizations and/or organizations; e.g., a UUID can be associated with one or more locations, buildings, distributed ledgers, and/or administrative operations; e.g., building entry/exit operations, timekeeping (clocking in and/or out) operations, printer-related operations. After a device D is registered with the fleet management system for job accounting, the fleet management system can provide device D with UUIDs and/or other identifiers for each sub-organization and/or organization utilizing device D. Device D can then query the fleet management system with a UUID U1 to obtain a corresponding list of n other devices, n≥0, also associated with UUID U1. Then, the n+1 devices (including device D) can be used to perform job accounting services using distributed ledgers for each sub-organization and/or organization associated with UUID U1.

Whenever a user U logs into a device, such as the above-mentioned device D, for the purposes of job accounting, device D will check which sub-organization(s) and/or organization(s) O1 ... Om, m≥0, are associated with user U. Then, based on the UUIDs (or other identifiers associated with O1, ... Om), device D will determine which other devices are associated with each of O1, ... Om, and will only broadcast trackable actions related to job accounting to the devices also associated with O1, ... Om.

For example, suppose user USR1 is only associated with one organization ORG1 that has a corresponding UUID UUID1, where UUID1 is associated with devices DEV1, DEV2, and DEV3. Then, when user USR1 enters a facility of organization ORG1 at some time TM1, a device DEV1 detects a badge or other identifier of user USR1, and uses the identifier of user USR1 to determine that user USR1 is associated with organization ORG1, and that organization ORG1 is associated with UUID1 that is also associated with two other devices: DEV2 and DEV3. After detecting the badge or other identifier of user USR1, device DEV1 can broadcast a trackable action TA1 recording entry of USR1 into the facility at time TM1 to devices DEV2 and DEV3 associated with UUID1. Then, each of devices DEV1, DEV2, and DEV3 can update a distributed ledger to record trackable action TA1. In some cases, DEV1 can broadcast multiple trackable actions associated with one event; e.g., the event of the entry of user USR1 into the facility at time TM1 recorded by trackable action TA1 and a trackable action TA2 recording user USR1 clocking in at time TM1 since user USR1 entered into the facility.

If ownership of a device D_CHG changes, the fleet management system can inform device D_CHG about its new owning organization, update lists of nodes associated with organizations for the change of ownership of device D_CHG, and broadcast the updates to the lists to other nodes. At this point, device D_CHG can delete any stored distributed ledgers and/or lists of nodes associated with its old owning organization.

Devices can use security to protect trackable actions. For example, a device can encrypt one or more trackable actions for a user USR2 with a private key for user USR2 and tag the trackable action(s) with an organization-specific header (including one or more UUIDs and/or other identifiers associated with one or more organizations) before broadcasting the trackable action(s). Use of the organization-specific header allows devices that belong to two or more networks to filter broadcast trackable actions before adding trackable actions and/or other job accounting information to one or more distributed ledgers associated with the organization(s) referred to by the UUID(s) and/or other identifiers in the organization-specific header.

One benefit of having job accounting information, such as building entry/exit information, clock-in/clock-out information, etc. in a distributed ledger recorded by multiple devices is that changing the details of job accounting information involves modifying the distributed ledger on each of the multiple devices. Further, in a blockchain that order of actions cannot be changed in the blockchain. If an employee tries to fake timecard details, it will be obvious because of timestamps in the transactions before and after their clock-in. The use of distributed ledgers implemented using blockchain technology to store trackable actions allows for greater transparency within and across the organization. In some cases, a distributed ledger shared throughout a department or larger organization can lead to elimination of duplicated effort and/or consolidation of budgets for possible cost savings related to prior use of centralized ledgers, etc. In some embodiments, the herein-described distributed ledger can be blockchain-technology agnostic; that is, as long as a particular blockchain technology can store trackable actions in blocks as described herein, the distributed ledger can use that blockchain technology. Then, if an organization already employs a particular blockchain technology, the organization could use that particular blockchain technology while operating the herein-described distributed ledger.

II. Printing System Examples

FIG. 1 is a schematic block diagram illustrating computing device 100, in accordance with at least some example embodiments. In some embodiments, computing device 100 can be configured to perform at least part of the herein-described functions of and/or functionality related to: a fleet management system, fleet management software, network 140, 200, printing devices 210, 212, 214, 216, computing devices 220, 222, document management system 230, door entry system node (DESN) 232, door entry system 234, 236, networks 140, 160, 170, ledger 400, methods 500, 600, 900, 1000, and scenario 700.

Computing device 100 can include one or more input devices 102, one or more output devices 104, one or more processors 106 and memory 108. Input devices 102 can include user input devices, network input devices, sensors, and/or other types of input devices. For example, input devices 102 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet® transceiver, a Universal Serial Bus (USB) transceiver, or similar transceiver configurable to communicate via a twisted pair wire, a coaxial cable, a fiber-optic link, or a similar physical connection to a wireline network, such as a wired portions of one or more of networks 140, 200 and/or wireless network receivers and/or transceivers, such as a Bluetooth® transceiver, a ZigBee® transceiver, a Wi-Fi® transceiver, a WiMAX™ transceiver, a wireless wide-area network (WWAN) transceiver and/or other similar types of wireless transceivers configurable to communicate via a wireless network, such as wireless portions of one or more of networks 140, 200. Sensors can include devices configured to measure conditions in an environment of computing device 100 and provide data about that environment, such data including, but not limited to, location data, velocity (speed, direction) data, acceleration data, and other data about the environment for computing device 100. Example sensors include, but are not limited to, GPS sensor(s), location sensors(s), gyroscope(s), accelerometer(s), magnetometer(s), camera(s), light sensor(s), infrared sensor(s), and microphone(s). Other input devices 102 are possible as well.

Output devices 104 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of one or more of networks 140, 200 and/or wireless network transmitters and/or transceivers, such as a Bluetooth® transceiver, a ZigBee® transceiver, a Wi-Fi® transceiver, a WiMAX™ transceiver, a wireless wide-area network (WWAN) transceiver and/or other similar types of wireless transceivers configurable to communicate via a wireless network, such as wireless portions of one or more of networks 140, 200. Other types of output devices can include, but are not limited to, vibration devices, haptic feedback devices, and non-visible light emission devices; e.g., devices that emit infra-red or ultra-violet light. Other output devices 104 are possible as well.

Processors 106 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 106 can be configured to execute computer-readable instructions 110 that are contained in memory 108 and/or other instructions as described herein.

Memory 108 can include one or more computer-readable storage media configured to store data and/or instructions that can be read and/or accessed by at least one of processors 106. The one or more computer-readable storage media can include one or more volatile and/or non-volatile storage components, such as optical, magnetic, organic or other memory or disc storage, which can be integrated in whole or in part with at least one of processors 106. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 108 can be implemented using a single physical device (e.g., one optical, magnetic, organic or other memory or disk storage unit), while in other embodiments, memory 108 can be implemented using two or more physical devices.

In particular, memory 108 can store computer-readable instructions 110 that, when executed by one or more of processor(s) 106, can cause a computing device to perform functions, such as but not limited to, functions of and/or functionality related to herein-described devices, networks, methods, features, and scenarios. In some embodiments, computer-readable instructions 110 can include instructions that, when executed, can perform part or the entire herein-described functionality of a door entry system node and/or a document management system.

In some embodiments, computer-readable instructions 110 can include at least instructions for blockchain software 112. Blockchain software 112, when executed by processors 106 of computing device 100, provides instructions to computing device 100 to carry out part or all of method 500, 600, 900, and/or 1000, and/or provide some or all of the functionality described with respect to scenario 700. In some embodiments, computer-readable instructions 110 and/or blockchain software 112 can include at least instructions to carry out at least part of the herein-described functionality of a fleet management system and/or fleet management software.

Figure 2:
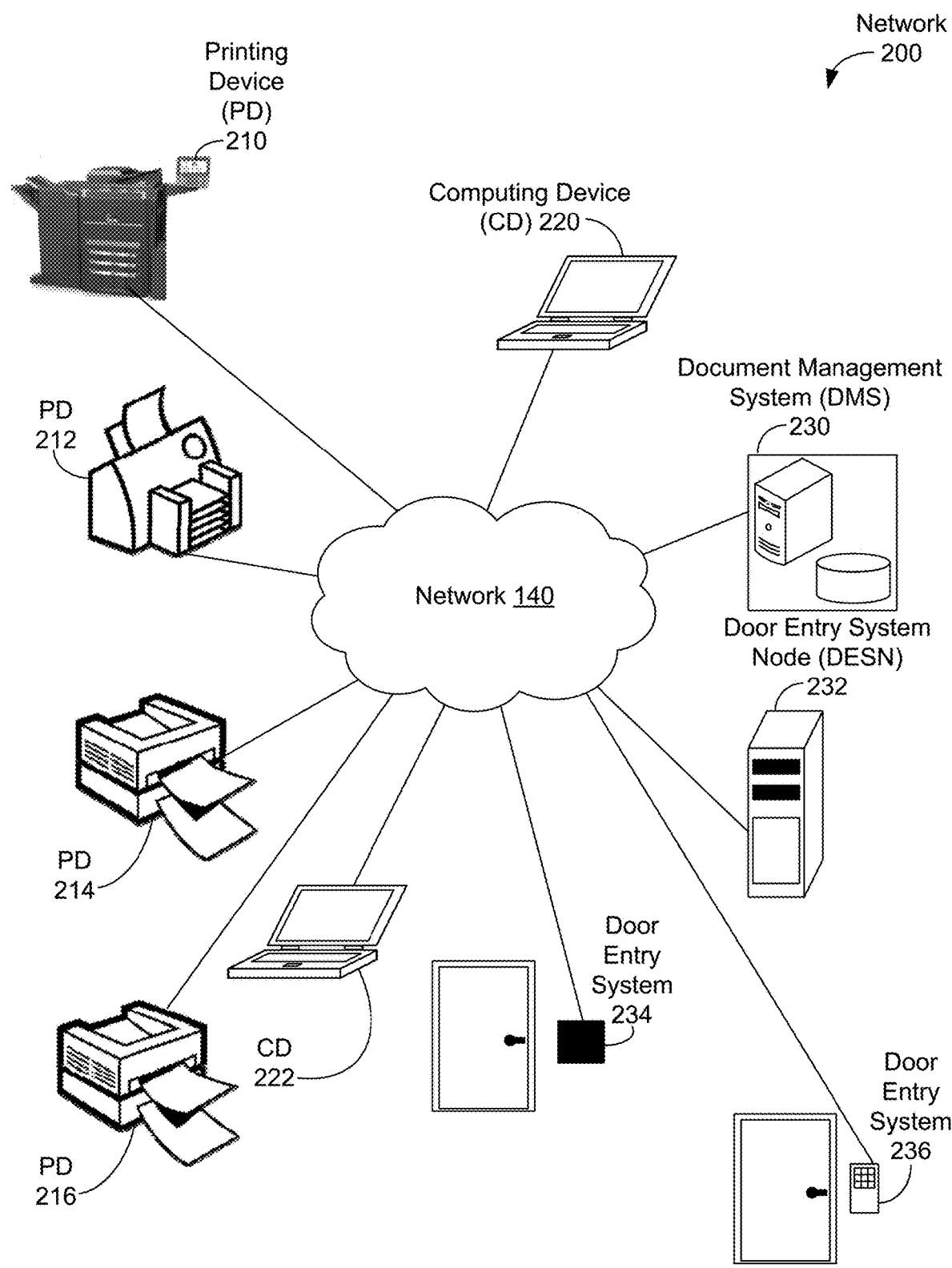
FIG. 2 is a diagram illustrating another network, in accordance with at least some example embodiments.

FIG. 2 is a diagram illustrating network 200, in accordance with at least some example embodiments. Network 200 includes printing devices (PDs) 210, 212, 214, 216, computing devices 220, 222, a server computing device acting as a document management system (DMS) 230, a server computing device acting as a door entry system node (DESN) 232, and door entry systems 234, 236, all interconnected using network 140. In some examples, network 200 can have more, fewer, and/or different types of computing devices, servers, printing devices, nodes, door entry system nodes, and/or door entry systems than indicated in FIG. 2.

Printing devices 210, 212, 214, 216 can include devices configured to scan, print, copy, e-mail, account for, communicate and/or otherwise process documents and/or files that are originally available either on paper or electronically. After processing by one or more of printing devices 210, 212, 214, 216, the documents and/or files can be subsequently available either on paper or electronically, as requested. That is, printing devices 210, 212, 214, 216 can process a paper document PAPERD or electronic document ED by at least: creating an electronic document ED1 representing the contents of PAPERD (e.g., scan PAPERD to create ED1), making one or more paper copies of PAPERD, printing one or more copies of ED and/or ED1 on one or more types of paper, make one or more electronic copies of ED and/or ED1, change a format of ED and/or ED1 (e.g., perform optical character recognition (OCR) scanning, convert a file format used to store ED and/or ED1), maintain remotely-accessible storage (e.g., a document box) enabling other devices than printing devices 210, 212, 214, 216 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 210, 212, 214, 216 can perform other tasks and/or other processing as well. Printing devices 210, 212, 214, 216 can include products from various manufacturers with variations in color, speed, computing power, functionality, network connectivity, and/or other features.

In an example embodiment, some or all printing devices 210, 212, 214, 216 can be connected to network 140 through one or more, possibly different, network protocols. Data can be transmitted between printing devices 210, 212, 214, 216, computing devices 220, 222, document management system 230, door entry system node 232, and/or door entry systems 234, 236 over wired and/or wireless links between computers, computing devices, printing devices, servers, door entry systems, door entry system nodes, and network 140. The format of each respective data transmission between devices in network 200 can include one or more of a variety of different formats including: text formats, image formats, extensible mark-up language (XML), Simple Network Maintenance Protocol (SNMP) formats, database tables, a flat file format, or another format.

Communications between the computers, computing devices, printing devices, servers, door entry systems, door entry system nodes can include: computing devices 220, 222, and document management system 230 sending data for print jobs and/or print job portions for printing to printing devices 210, 212, 214, 216; printing devices 210, 212, 214, 216 sending alert, status, error, device information, colorant-usage information, maintenance-event information, and/or other messages to computing devices 220, 222, and document management system 230 to inform other devices about colorant-usage, maintenance, error, and/or other conditions of the printing devices; e.g., idle, printing, sleeping, paper jam, low or out of paper, low or out of toner/ink, etc.; and printing devices 210, 212, 214, 216, computing devices 220, 222, document management system 230, door entry system node 232, and/or door entry systems 234, 236 communicating trackable actions, portions of (e.g., blocks, block header) and/or entire distributed ledgers, blockchain-related data, and/or other data related to trackable actions and/or distributed ledgers using network 140. Other communications between printing devices 210, 212, 214, 216, computing devices 220, 222, document management system 230, door entry system node 232, and/or door entry systems 234, 236 are possible as well, such as, but not limited to, communications related to one or more maintenance and management operations.

One or more of computing devices 220, 222 can create, obtain, update, display, and/or delete data (and perhaps related software) for configurations of network 200. Example data for configurations of network 200 includes, but is not limited to: data for configuring devices in network 200; e.g., data for printing devices 210, 212, 214, 216, data for configuring network protocols (e.g., File Transfer Protocol (FTP), HyperText Transfer Protocol (HTTP), Java Message Service (JMS), Kyocera Page Description Language (KPDL™), Private Communications Technology (PCT), Adobe® Page Description Format (PDF), Simple Object Access Protocol (SOAP), Short Message Service (SMS™), Simple Message Transfer Protocol (SMTP), SNMP, Transfer Control Protocol/Internet Protocol (TCP/IP), User Datagram Protocol (UDP), Lightweight Directory Access Protocol (LDAP), MQ, and/or other protocols), access-management related data for clients and/or servers; (e.g., passwords, signatures, credentials, certificates, subscriptions, licenses, and/or tokens related to accessing part or all of the functionality of network 140 and/or cloud-based services, software and/or solutions) and data for customizing, configuring and managing applications on devices/servers of networks 200.

Document management system 230 can be used to perform one or more remote maintenance activities for one or more printing devices 210, 212, 214, 216. The one or more remote maintenance activities can include, but are not limited to, one or more maintenance and management operations. In some examples, document management system 230 and one or more of computing devices 220, 222 can cooperate to perform the one or more remote maintenance activities. For example, computing device 220 can be registered as a maintenance agent for one or more of printing devices 210, 212, 214, 216, and can therefore be used to schedule, coordinate, and execute the remote maintenance activities for registered printing devices with document management system 230. In other examples, document management system 230 and computing device 220 can communicate data, reports, and other information about printing devices registered with a network device manager. In even other examples, document management system 230 can perform some or all of the herein-described features of a fleet management system.

Door entry system node 232 can receive data from door entry systems 234, 236 about entries into and/or exits from a secured area; e.g., part or all of a building, structure, and/or enclosed area. The data can relate to entry of an entity into the secured area and/or an exit of the entity from a secured area, where the entity can be an employee, owner, contractor, equipment, package, robot, or other agents and/or material associated with the secured area.

Data for trackable actions can be communicated using network 200. For example, data related to one or more trackable actions for one or more printer-related transactions, entry-or-exit transactions, and/or document-related transactions can be communicated using network 200. A printer-related transaction can include transactions involving one or more of printing devices 210, 212, 214, 216, computing devices 220, 222, and document management system 230; e.g., one or more of: a transaction related to printing a document, a transaction related to scanning a document, and a transaction related to communicating a document using a printing device; one or more of: a transaction related to maintaining colorant of a printing device, a transaction related to firmware of a printing device, a transaction related to changing an organization associated with a printing device, a transaction related to one or more counters of a printing device, and a transaction related to changing information used to control and/or identify a printing device. An entry-or-exit transaction can include one or more transactions involving one or more of door entry system node 232, and door entry systems 234, 236; e.g., the entry-or-exit transaction can include one or more of: a transaction related to an entry of an entity into a secured area and a transaction related to an exit of the entity from the secured area. A document-related transaction can include one or more transactions involving a document; e.g., a transaction related to a particular document, a transaction related to one or more documents associated with a particular entity, a transaction related to one or more documents associated with a particular node, a transaction related to one or more documents associated with a particular network address, and a transaction related to one or more documents associated with a particular geographical location.

Data for distributed ledgers can be communicated using network 200. This data about one or more distributed ledgers can include, but is not limited to, trackable actions (e.g., as discussed in the paragraph immediately above), blocks, hash values, timestamps, block headers, trackable action notifications, other distributed ledger notifications (e.g., a notification of an added block), distributed ledger queries and query responses, cryptographic keys, and entire distributed ledgers. Other data can be communicated using network 200 as well.

In some embodiments, one or more additional computing devices, e.g., one or more servers and/or computing devices, can be used in network 200 to perform additional functions, such as functions for one or more document solutions and managed print services, prediction-related functions, act as databases, provide machine learning functionality, and other functions.

Figure 3:
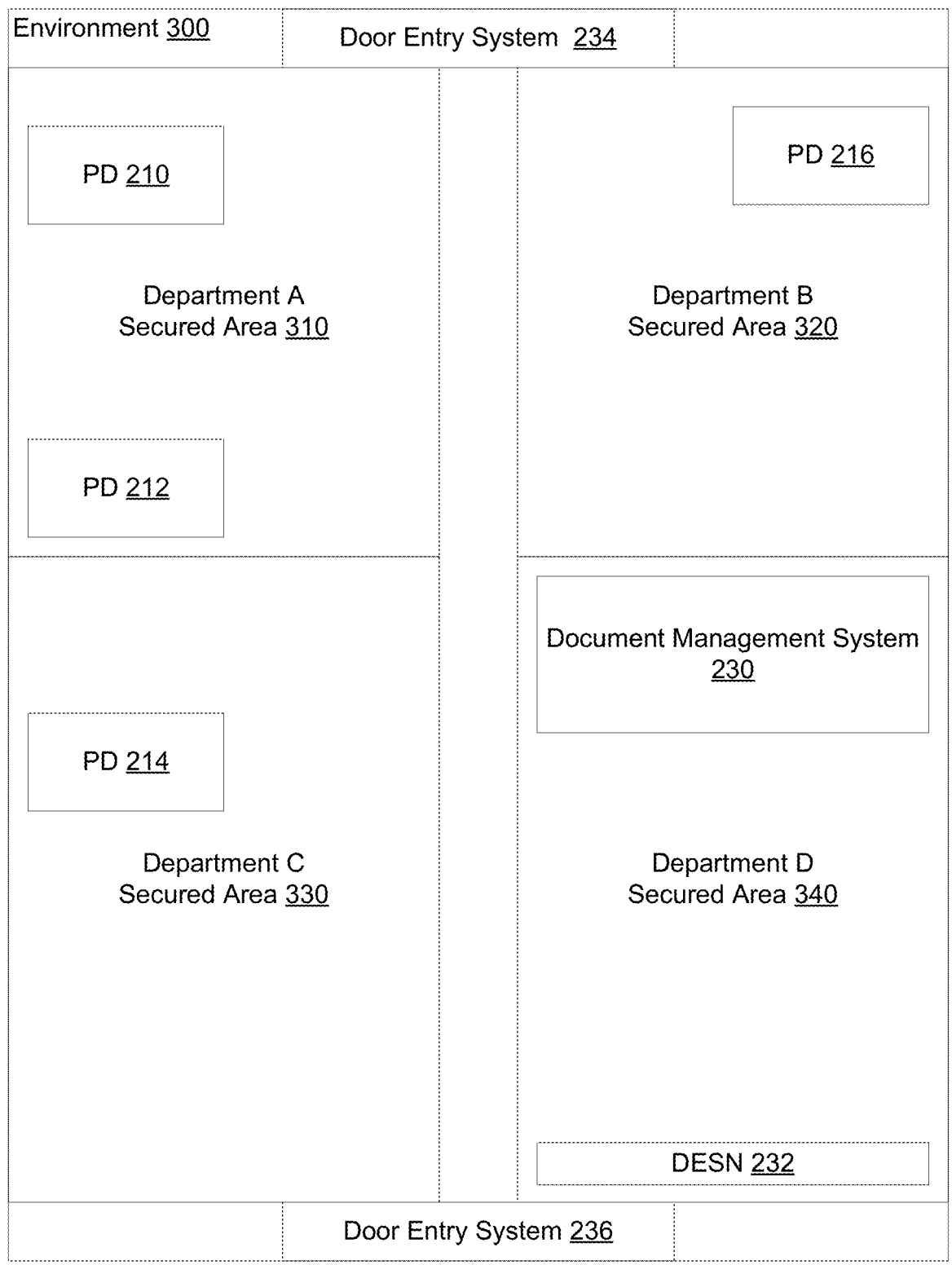
FIG. 3 is a diagram of an environment, in accordance with at least some example embodiments.

III. Techniques for Using Distributed Ledgers of Trackable Actions with Blockchains FIG. 3 is a diagram of environment 300 in accordance with at least some example embodiments. Environment 300 includes a building that has at least two doors for entering and exiting environment 300: one door protected using door entry system 234 and another door protected using door entry system 236. Environment 300 is then divided into four secured areas 310, 320, 330, 340 associated with respective Departments A, B, C, D. Secured area 310 for Department A has two printing devices 210, 212, secured area 320 for Department B has one printing device 216, secured area 330 for Department C has one printing device 214, and secured area 340 for Department D has document management system 230 and door entry system node 232. As previously illustrated in FIG. 2, printing devices 210, 212, 214, 216, door entry system node 232, and door entry systems 234, 236 are connected using network 140 and are so connected within environment 300 (network 140 not shown in FIG. 3). In other examples, environment 300 can be a different secured area than a building; e.g., an enclosed outdoor space, such as a fenced lot, a mixed indoor-outdoor space, a temporary building or other structure. In still other examples, environment 300 can include more, less, and/or different doors, door entry systems, departments, printing devices, document management systems, networks, and/or computing devices.

In some scenarios, devices are assigned to organizations, such as departments, in environment 300. That is, a device is only used by and/or processes information for the department that is assigned to the device. For example, printing devices 210 and 212 can be assigned to Department A and therefore would only process information (e.g., documents, trackable actions, distributed ledgers) associated with Department A. In related scenarios, printing device 216 can be assigned to Department B and/or printing device 214 can be assigned to Department C.

In some scenarios, Departments A, B, C, and D are four departments of a larger organization; e.g., organization O300. Then, in some of these scenarios, some devices can be assigned to departments of organization O300, and some devices can be available throughout the organization; e.g., printing devices 210 and 212 can be assigned to Department A while document management system 230 and/or door entry system node 232 can be used throughout organization O300. In a particular scenario, printing devices 210 and 212 are assigned to department A and act as nodes to store, update, maintain, and/or process queries for an associated distributed ledger DL300_A that is only for Department A. Then, when a new block is added to distributed ledger DL300_A by one of the associated nodes N1 for distributed ledger DL300_A (e.g., printing device 210 or printing device 212), the associated node N1 can send a message about the new block to some or all of the other nodes associated with associated distributed ledger DL300_A. In another particular scenario, In still other scenarios, devices may be assigned to departments while still processing information related to other departments. For example, organization O300 can have a distributed ledger DL300_ALL that relates to at least departments A, B, C, and D. Then, some or all of printing devices 210, 212, 214, 216, document management system 230, door entry system node 232, and door entry system 234, 236 can act as nodes to store, update, maintain, and/or process queries for an associated distributed ledger DL300_ALL. In a particular scenario, printing devices 210, 212, 214, 216, document management system 230, and door entry system node 232 act as associated nodes to store, update, maintain, and/or process queries for associated distributed ledger DL300_ALL. Then, when a new block is added to associated distributed ledger DL300_ALL by one of the associated nodes N2 for distributed ledger DL300_ALL, the associated node N2 can send a message about the new block to some or all of the other nodes associated with distributed ledger DL300_ALL. Other scenarios related to nodes assigned to departments and processing information thereof are possible as well.

Figure 4:
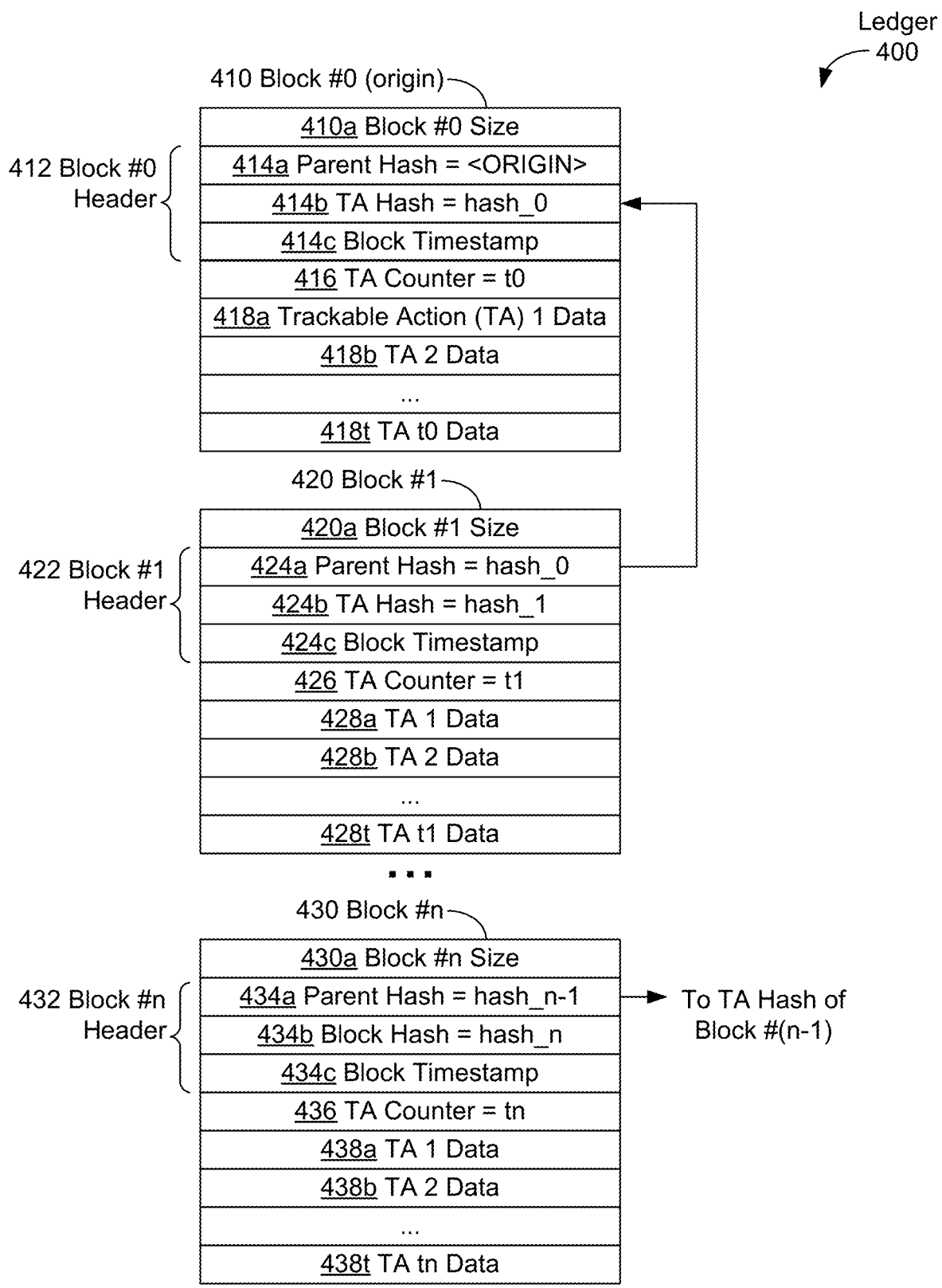
FIG. 4 is a diagram of a distributed ledger, in accordance with at least some example embodiments.

FIG. 4 is a diagram of a ledger 400, in accordance with at least some example embodiments. Ledger 400 can be shared or distributed with multiple nodes, and thus ledger 400 can be used as a distributed ledger.

FIG. 4 shows that ledger 400 includes n blocks that include block 410 numbered as block #0, block 420 numbered as block #1, and block 430 numbered as block #n. Each of blocks 410, 420, and 430 is formatted using a format that includes a number of fields of data. For example, block 410 has size field 410*a*, a parent hash field 414*a*, a trackable action (TA) hash field 414*b*, a block timestamp field 414*c*, a trackable action counter field 416, and fields 418*a*, 418*b* . . . 418*t* for storing trackable action data in block 410. Similarly, block 420 has size field 420*a*, parent hash field 424*a*, trackable action hash field 424*b*, block timestamp field 424*c*, trackable action counter field 426, and fields 428*a*, 428*b* . . . 428*t* of trackable action data for storing trackable action data in block 420. Further, block 430 has size field 430*a*, parent hash field 434*a*, trackable action hash field 434*b*, block timestamp field 434*c*, trackable action counter field 436, and fields 438*a*, 438*b* . . . 438*t* of trackable action data for storing trackable action data in block 420.

A block size field, as illustrated by fields 410*a*, 420*a*, 430*a*, can record a size; e.g., in bytes or other data storage units, of a block in ledger 400. For example, if block #0 is 1536 bytes in size, block size field 410*a* can have a value of 1536. As another example where the data storage units are bits and where 8-bit bytes are used, if block #0 is 1536 bytes in size, block size field 410*a* can have a value of 12288. Other examples, e.g., using words as storage units, are possible as well.

A parent hash field, as illustrated by fields 414*a*, 424*a*, 434*a*, can record a hash value for the trackable actions stored in trackable action data fields of a prior or parent block. In the origin block—block #0 labeled block 410 in FIG. 4—the parent hash value can have a predetermined value shown as "<ORIGIN>" in field 414*a* of FIG. 4. The predetermined value can be a fixed value; e.g., 0, −1, or another number, a hash value calculated for a predetermined data string; e.g., a hash value of a known phrase or other group of words, such as "This is the parent hash string.", or another predetermined value; e.g., a predetermined number of digits of a well-known value such as π or e.

A prior block to block B is a block created and placed into ledger 400 before block B. Then, a parent block B1 to a block, such as block B, is an immediately prior block; that is, block B1 is the block created and placed into ledger 400 directly before block B. For example, block 410 is prior to blocks 420 and 430, but is only immediately prior to block 420 and thus block 410 is the parent block for block 420. In cases where n>2, block 420 would not be the parent block to block 430; rather, block 420 would be the parent block to block #2 (block #2 not shown in FIG. 4 for the example where n>2).

In all other blocks than the origin block, a parent hash field can store a hash value of a parent block of ledger 400. For example, parent hash field 424*a* of block 420 can store a value "hash_0" that is the hash value stored for trackable actions stored in parent block 410, which also stores the value "hash_0" in trackable action hash field 414*b*. Thus, each block in ledger 400 includes information about a parent block, except for block 410 (which is the origin block for ledger 400).

A trackable action hash field, as illustrated by fields 414b, 424b, 434b, can be a hash value for the trackable actions stored in trackable action data fields. In some cases, the hash value can be a hash value for the data stored in a trackable action counter field as well as the trackable actions stored in trackable action data fields.

A hash value in ledger 400; e.g., a hash value stored in a parent hash field, a hash value stored in a trackable action hash field, can be calculated using a hash function. For example, the hash function can include a secure hash function that is based on a secure hash algorithm. One set of secure hash algorithms include the Secure Hash Algorithm (SHA) family of algorithms published by the National Institute of Standards and Technology (NIST), such as the family including the SHA-0, SHA-1, SHA-2, SHA-3, SHA256, SHA384, and SHA512 secure hash algorithms.

The secure hash function can receive an input, such an input including one or more trackable actions, and generate a corresponding fixed-size output hash value. To calculate hash values, a hash function can perform a series of operations on the input; e.g., permute portions (e.g., bytes) of the input, perform bit manipulations, add/subtract/multiply/divide by pre-determined or other values, execute other functions on part or all of the input, etc.

The hash function can be selected to be secure; in this context, a secure hash function is a function that is difficult to invert, and to have a large enough range of output hash values to make collisions, or two different inputs with the same output hash values, unlikely. In the context of ledger 400, the input, such as a block of trackable actions, can be verified as not having been modified by recalculating the hash value using the secure hash function and comparing the recalculated hash value to the hash value for the input stored in ledger 400—if the recalculated hash value equals the hash value stored in ledger 400, the input has very likely not been modified; otherwise, the input has been modified.

In one example, the SHA256 secure hash algorithm can be used by a hash function to generate cryptographically secure hash values that can be used as hash values in ledger 400. Other example uses of secure hash algorithms, other secure hash algorithms (e.g., the Message Digest 4 and 5 (MD4 and MD5) secure hash algorithms; the BLAKE family of secure hash algorithms, the RACE Integrity Primitives Evaluation Message Digest (RIPEMD) family of secure hash algorithms), other hash functions, and/or other hash values for ledger 400 are possible as well.

A block timestamp field, as illustrated by fields 414c, 424c, 434c, can record a time of creation of the block.

To communicate information about a block in ledger 400 without sending a complete block, a block header can be communicated. For example, to verify, validate, or otherwise provide information about a block B, the block header for block B can be communicated. The block header for block B can include a parent hash field value for block B, a trackable action hash field value for block B, and block timestamp value for block B. For example, FIG. 4 shows block #0 header 412 for block #0 410 that includes values of parent hash field 414a, trackable action hash field 414b, and block timestamp value 414c. FIG. 4 also shows block #1 header 422 for block #1 420 that includes values of parent hash field 424a, trackable action hash field 424b, and block timestamp field 424c and shows block #n header 432 for block #n 430 that includes values of parent hash field 434a, trackable action hash field 434b, and block timestamp field 434c. In other examples, more, less, and/or different data can be in a block header.

A trackable action counter field, as illustrated by fields 416, 426, 436, can include data about a number, or count, of trackable actions stored in a block of ledger 400. For example, if block #0 stores 13 trackable actions, then trackable action counter field 416 can be set to a value t0=13. Each block of ledger 400 can store a different number of trackable actions depending on the size of the block.

A trackable action data field, as illustrated by fields 418a, 418b . . . 418t; 428a, 428b . . . 428t; 438a, 438b . . . 438t, can store information about a trackable action. For example, a trackable action data field can store a trackable action and/or metadata about the trackable action; examples of metadata include, but are not limited to, timestamps, sending node data, employee identification data, organization identification data, cryptographic keys, trackable action formatting information, and trackable action size information.

In other examples, a block in ledger 400 can include more, fewer, and/or different fields of data. For example, in particular examples, each block of ledger 400 can have the same size; e.g., each of block size fields 410a, 420a, 430a have the same value. In more particular of these examples, each trackable action in ledger 400 has the same size when stored in a block—then, as blocks and trackable actions have fixed sizes, the number of trackable actions stored in a block is a constant value, and so each of trackable action counter fields 416, 426, 436 has the same values. In some of these examples, block size fields and/or trackable action counter fields can be omitted from blocks in ledger 400 as being redundant. In still other examples, trackable actions can have different sizes; then, a block of ledger 400 can have fields of data related to the size of each trackable action stored in trackable action data fields within the block. Many other examples of more, fewer, and/or different fields of data are possible as well.

In some blockchain examples, a challenge value, such as a value representing a solution to a pre-determined (difficult) problem, has to be provided by a node prior to the node creating a block; e.g., a challenge value has to be "mined" or computed to earn the right to create a block. In the example ledger shown in FIG. 4, no challenges are recorded or required for block creation. In other embodiments, a challenge can be required and/or one or more corresponding challenge values can be recorded with a block as part of block creation.

Figure 5:
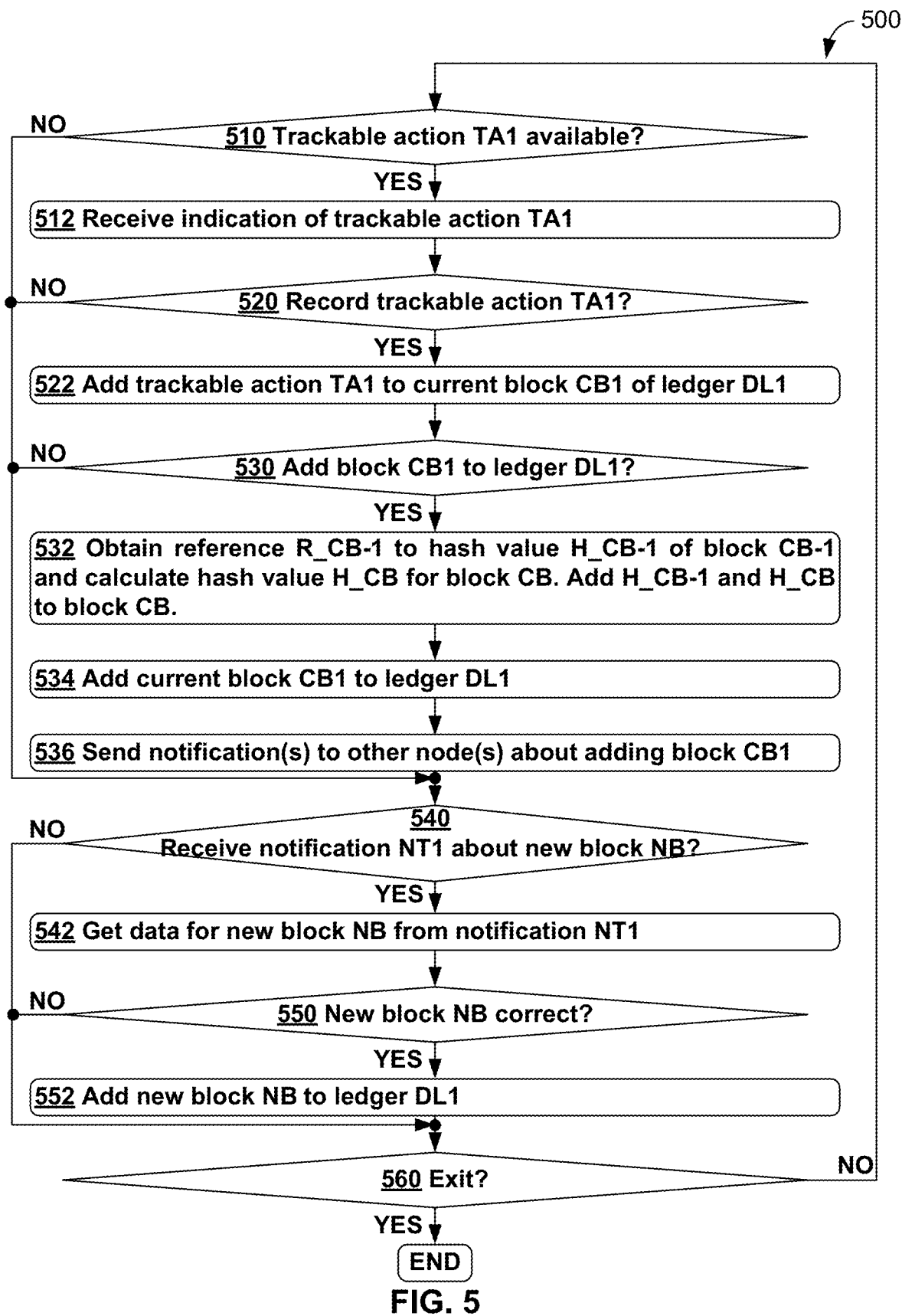
FIG. 5 is a flowchart of a method, in accordance with at least some example embodiments.

FIG. 5 is a flowchart of method 500, in accordance with at least some example embodiments. Method 500 can be carried out by a computing device acting as a node, such as computing device 100, document management system 120, door entry system node 232, and/or a printing device; e.g., printing device 210, 212, 214, 216. Method 500 can begin at block 510, where the node can determine whether a trackable action TA1 is available. If trackable action TA1 is available to the node, the node can proceed to block 512. Otherwise, trackable action TA1 is not available to the node and the node can proceed to block 540.

Trackable action TA1 can be a record of a transaction and/or record other information. For example, trackable action TA1 can be a record of one or more printer-related transactions, entry-or-exit transactions, and/or document-related transactions. In some examples, a printer-related transaction can include one or more of: a transaction related to printing a document (e.g., a document printed by one or more nodes), a transaction related to scanning a document (e.g., a document scanned by one or more nodes), a transaction related to communicating a document using a printing device (e.g., a document sent by one or more nodes and/or received at one or more nodes), a transaction related to maintaining colorant of a printing device (e.g., an operation of adding, replacing, removing, and/or changing toner, ink, dye, and/or other pigment substance used by one or more nodes), a transaction related to firmware of a printing device (e.g., an operation of updating, replacing, downloading and/or installing firmware on one or more nodes), a transaction related to changing an organization associated with a printing device (e.g., an operation of assigning and/or reassigning one or more nodes to a department or other organization), a transaction related to one or more counters of a printing device (e.g., one or more daily, weekly, monthly, and/or annual printed, scanned, and/or copied page counters, a minimum value counter, a maximum value counter associated with one or more nodes), and a transaction related to changing information used to control and/or identify a printing device (e.g., a transaction related to changing a name, geographical address, and/or a network address associated with one or more nodes).

As a more particular example, suppose a document D is scanned using printing device 210 in environment 300; then, document D is transmitted from printing device 210 to computing device 222, and subsequently, firmware of printing device 210 is installed to upgrade printing device 210. Then, at least three printer-related transactions can occur in this particular example—a first printer-related transaction for scanning document D using printing device 210, a second printer-related transaction for communicating document D from printing device 210 to computing device 222, and a third printer-related transaction for upgrading the firmware of printing device 210. Many other examples related to printer-related transactions are possible as well.

In some examples, an entry-or-exit transaction can include one or more of: a transaction related to an entry of an entity into a secured area and a transaction related to an exit of an entity from a secured area. As a more particular example, suppose an employee E of organization O300 enters into environment 300 via door entry system 234 at time T1, goes to secured area 310, and, after some time, leaves environment 300 via door entry system 234 at time T2. Then, at least two entry-or-exit transactions can occur in this particular example—a first transaction related to entry of employee E into environment 300 at time T1 via a door associated with door entry system 234, and a second transaction related to exit of employee E from environment 300 at time T2 via a door associated with door entry system 234. Many other examples related to entry-or-exit transactions are possible as well.

In some examples, a document-related transaction can include one or more of: a transaction related to a particular document (e.g., a transaction related to a specific document D1), a transaction related to one or more documents associated with a particular entity, (e.g., a transaction related to one or more documents associated with a specific entity E1), a transaction related to one or more documents associated with a particular node (e.g., a transaction related to one or more documents associated with a specific node N1), a transaction related to one or more documents associated with a particular network address (e.g., a transaction related to one or more documents associated with a specific network address IP1), and a transaction related to one or more documents associated with a particular geographical location (e.g., a transaction related to one or more documents associated with a specific street address, city, state, province, county, country, continent, etc.). As a more particular example, suppose an employee E2 of organization prints document D2 using a printing device PD2 having an Internet Protocol (IP) address (e.g., a network address) of IP2. Then, at least four document-related transactions can occur in this particular example—a first transaction related to a specific document D2, a second transaction related to a specific entity/employee E2 also associated with document D2, a third transaction related to a specific node PD2 also associated with document D2, and a fourth transaction related to a specific network address IP2 also associated with document D2. Many other examples related to document-related transactions are possible as well.

At block 512, the node can receive an indication of trackable action TA1. For example, a node can generate the indication of trackable action TA1; e.g., a printing device acting as a node can print a document D3 and generate a related notification of trackable action TA1, such as a printer-related transaction related to printing the document D3. As another example, the node can receive the indication of trackable action TA1; e.g., a printing device acting as a node can receive an indication of trackable action TA1 for an entry-or-exit transaction of an employee E3 into environment 300. Many other examples of receiving indications of trackable actions are possible as well.

At block 520, the node can determine whether to record trackable action TA1 in a distributed ledger DL1. If the node determines to record trackable action TA1 in distributed ledger DL1, the node can proceed to block 522. Otherwise, the node determines not to record trackable action TA1 in distributed ledger DL1 and the node can proceed to block 540.

At block 522, the node can add trackable action TA1 to current block CB1 of distributed ledger DL1. In some examples, the node can add data about trackable action TA1 to an already existing current block CB1. In other examples, the node can create a new block and use the newly-created block as current block CB1. In still other examples, current block CB1 can be formatted using a format of a block of ledger 400, such as block 410, block 420, or block 430.

At block 530, the node can determine whether to add current block CB1 to distributed ledger DL1. For example, if current block CB1 is filled with trackable actions, then the node can determine to add the current block to distributed ledger DL1; otherwise, the node can wait until the current block CB1 is filled before adding the block to distributed ledger DL1. If the node determines to add current block CB1 to distributed ledger DL1, the node can proceed to block 532. Otherwise, the node determines not to add current block CB1 to distributed ledger DL1 and the node can proceed to block 540

At block 532, as part of adding current block CB1 to distributed ledger DL1, the node can obtain a reference R_CB-1 to hash value H_CB-1 of block CB-1, where block CB-1 is a last block in distributed ledger DL1; e.g., block CB-1 is a parent block for current block CB. Then, hash value H_CB-1 is the parent hash value for current block CB. The node can also calculate hash value H_CB for block CB; e.g., H_CB can be a hash value of trackable actions stored in current block CB1. Once the node has determined hash values H_CB-1 and H_CB, then the node can add hash values H_CB-1 and H_CB to current block CB; e.g., hash values H_CB-1 and H_CB can be added as respective parent hash and TA hash values to a block header of current block CB, where current block CB uses a format of a block of ledger 400. In some examples, the reference R_CB-1 to hash value H_CB-1 can be the hash value H_CB-1 itself.

At block 534, the node can add current block CB1 to distributed ledger DL1. In some examples, by adding hash values H_CB-1 and H_CB to current block CB1, current block CB1 is added to distributed ledger DL1 as stored on the node.

At block 536, the node can send one or more notifications to one or more other nodes storing distributed ledger DL1 about adding block CB1 to distributed ledger DL1; that is, current block CB1 can be distributed to the one or more other nodes. In some cases, the node is associated with a first organization and the one or more other nodes (e.g., a plurality of other nodes) are associated with a plurality of organizations that include the first organization. Then, sending the one or more notifications to the one or more other nodes storing distributed ledger DL1 about adding block CB1 can include sending the one or more notifications only to other nodes in the plurality of nodes that are also associated with the first organization.

In other methods, the notifications sent to other nodes can include notifications sent to inform the other nodes about trackable action TA1 being recorded rather than and/or along with adding trackable action TA1 to block CB1—in some of these other methods, notifications to inform the other nodes about trackable action TA1 may be sent as part of the processing occurring at block 522.

At block 540, the node can determine whether the node has received a notification NT1 about a new block NB. For example, the node can determine whether the node has received notification NT1 about new block NB that was sent from another node using the procedures of block 536. If the node determines that the node has received a notification NT1 about new block NB, the node can proceed to block 542. Otherwise, the node determines that the node has not received a notification about a new block and the node can proceed to block 560.

At block 542, the node can obtain data for new block NB. For example, new block NB may be stored in a notification informing the node about the new block—then, the node can obtain the data for the new block NB from the notification. In another example, the notification about the new block NB may include a reference REF1 to the data for new block NB—then, the node can use the reference REF1 to obtain the data for the new block NB. Other techniques of obtaining the data for new block NB are possible as well.

At block 550, the node can determine whether data for new block NB is correct. For example, the node can calculate a hash value NODE_HASH for trackable actions stored in block NB and can compare the calculated hash value NODE_HASH with a hash value BLOCK_HASH for the trackable actions stored in block NB, where BLOCK_HASH is stored as part of block NB. If the calculated hash value NODE_HASH equals the stored BLOCK_HASH value, then the node can determine that the data for new block NB is correct. Other techniques than comparing BLOCK_HASH and NODE_HASH for determining correctness of data stored in new block NB are possible as well.

If the node determines that data for new block NB is correct, the node can proceed to block 552; otherwise, the node determines that data for new block NB is not correct and the node can proceed to block 560. In some examples, the test for the correctness of data for new block NB at block 550 can be omitted—in these examples, the node can proceed directly to block 552 after completing the procedures of block 542.

At block 552, the node can add the new block NB to distributed ledger DL1. For example, the node can store new block NB in a predetermined storage location (or locations) allocated for use by DL1. In another example, the node can allocate a new block in a predetermined storage location (or locations) for distributed ledger DL1 and copy the data from new block NB to the allocated new block. Other techniques for adding new block NB to distributed ledger DL1 stored on the node are possible as well.

At block 560, the node can determine whether to exit method 500. If the node determines to exit method 500, then the node can terminate execution of (i.e., exit) method 500. Otherwise, the node determines not to exit method 500, and the node can proceed to block 510.

Figure 6:
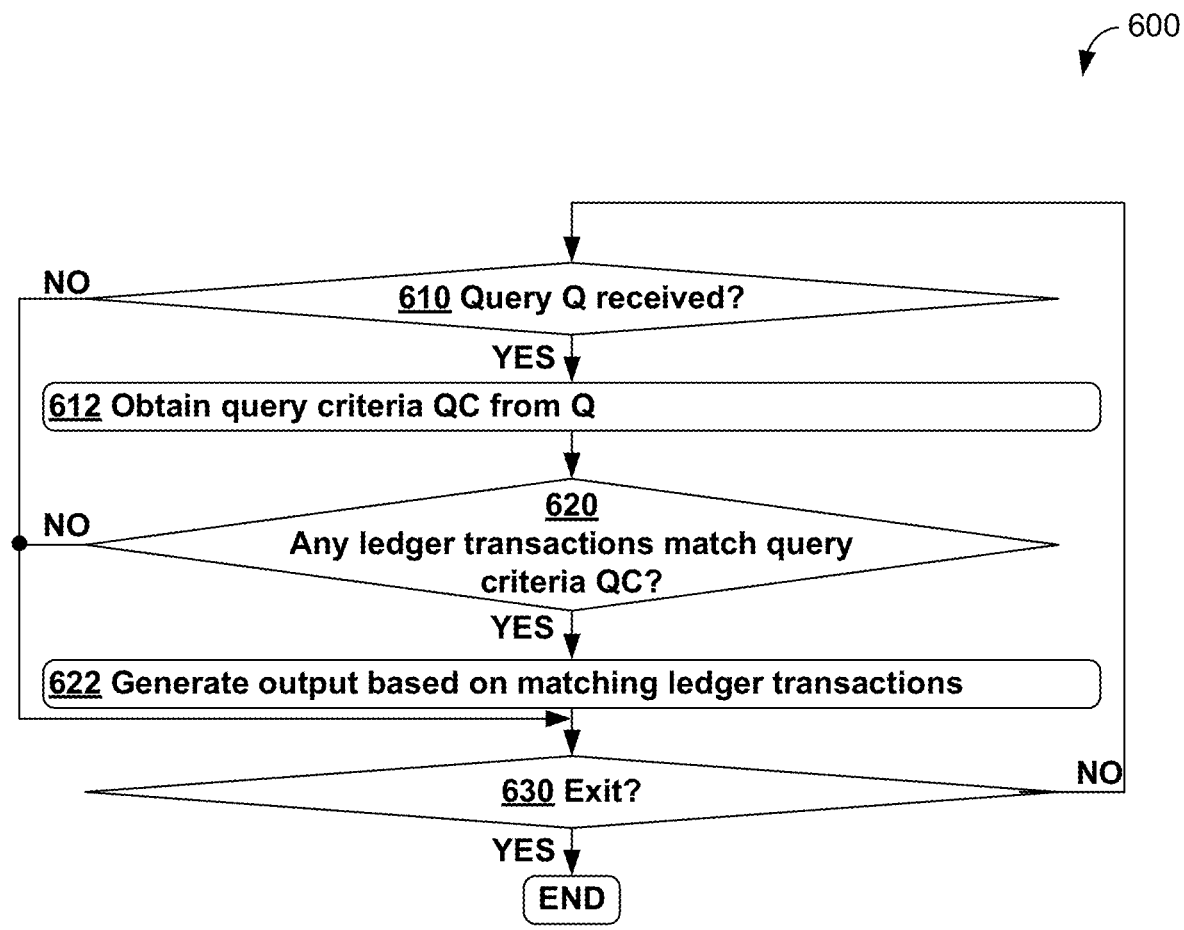
FIG. 6 is a flowchart of another method, in accordance with at least some example embodiments.

FIG. 6 is a flowchart of method 600, in accordance with at least some example embodiments. Method 600 can be carried out by a computing device acting as a node, such as computing device 100, document management system 120, door entry system node 232, and/or a printing device; e.g., printing device 210, 212, 214, 216.

Method 600 can begin at block 610, where the node can determine whether a query Q has been received. If a query Q has been received at the node, the node can proceed to block 612. Otherwise, no query has been received at the node, and the node can proceed to block 630.

At block 612, the node can obtain query criteria QC from query Q. The query criteria QC can be used to select zero or more trackable actions that result from query Q. In one example, query criteria QC can indicate that trackable actions related to a particular printing device (or devices) specified in query criteria QC are to be output; e.g., query criteria QC can be used to select all trackable actions associated with printing device 210. In another example, query criteria QC can indicate that trackable actions related to one or more times specified in query criteria QC are to be output; e.g., query criteria QC can be used to select all trackable actions having a timestamp between 0100 and 0200 on 14 Dec. 2017. In still another example, query criteria QC can indicate that trackable actions related to a particular document (or documents) specified in query criteria QC are to be output; e.g., query criteria QC can be used to select all trackable actions associated with a document named "D4". Other query criteria, including but not limited to, combinations of these examples are possible as well.

In some cases, query criteria QC can be associated with, and perhaps include, one or more cryptographic keys. For example, if a trackable action associated with an employee (or other entity) is encrypted using a private key of the employee (or other entity), then the query criteria QC can include a copy or reference to the private key and/or a copy or reference to a corresponding public key. As another example, part or all of the data stored with a distributed ledger DL_ENC can be encrypted using a private key DL_ENC_PrivKey associated with the distributed ledger DL_ENC. Then, query criteria QC can include a copy or reference to a public key DL_ENC_PubKey also associated with the distributed ledger DL_ENC that enables decryption of at least some encrypted data stored in distributed ledger DL_ENC. In still other cases, query criteria QC can be associated with both a key associated with the distributed ledger (e.g., the public key DL_ENC_PubKey) and one or more keys associated more specifically with query Q (e.g., a public key associated with an employee referenced to in query criteria QC).

In some embodiments, the node can receive information about one or more keys associated with query Q and/or query criteria QC and use that information while carrying out method 600. For example, a query Q can include a reference to a "key register", where the key register stores one or more cryptographic keys associated with an entity providing query Q to the node. The node can then retrieve cryptographic keys as needed to process query Q from the key register. For example, suppose a query Q is formulated by an entity QueryEnt1 and query Q includes a reference to a key register QueryEntKR for the entity QueryEnt1. In this example, the key register reference QueryEntKR refers to cryptographic keys stored for QueryEntKR, a public key for a distributed ledger and one or more public keys associated with entities, such as a public key associated with employee Emp123. Then, in processing query Q of a distributed ledger DL_EX1, the node can retrieve keys as needed from the key register; e.g., the node can use key register reference QueryEntKR to obtain the public key for the distributed ledger DL_EX1 as needed to decrypt data of distributed ledger DL_EX1 and can use key register reference QueryEntKR to obtain the public key associated with employee Emp123 as needed to decrypt trackable actions encrypted using a private key paired with the public key associated with employee Emp123. Other examples related to cryptographic keys and queries are possible as well.

At block 620, the node can determine whether the distributed ledger includes any ledger transactions; e.g., transactions of trackable actions, which match query criteria QC. If the node determines that the distributed ledger includes one or more ledger transactions that match query criteria QC, the node can proceed to block 622.

Otherwise, the node determines that the distributed ledger does not include any ledger transactions that match query criteria QC, and the node can proceed to block 630. In some examples, the node can generate an output indicating that no ledger transactions match query criteria QC or a similar output prior to proceeding to block 630.

At block 622, the node can generate an output based on the one or more ledger transactions that match query criteria QC. For example, the output of the node can include information. Such information can relate to trackable actions, such as the example trackable actions discussed above in the context of method 500. More particularly, the information can include, but is not limited to, one or more of: information about a document printed using a node, information related to a document scanned using a node, information about a document that was communicated using a node, information related to maintaining colorant of a node, information related to firmware of a node, information related to an organization associated with a node, information related to one or more counters for a node, information related to information used to control and/or identify a node, information about an entry of an entity into a secured area, information about an exit of an entity from a secured area, information about a specific document, information about one or more documents associated with a particular entity, information about one or more documents associated with a particular node, information related to one or more documents associated with a particular network address, and information related to one or more documents associated with a particular geographical location. Other information can be provided as an output of the node as well.

At block 630, the node can determine whether to exit method 600. If the node determines to exit method 600, then the node can terminate execution of (i.e., exit) method 600. Otherwise, the node determines not to exit method 600, and the node can proceed to block 610.

Figure 7:
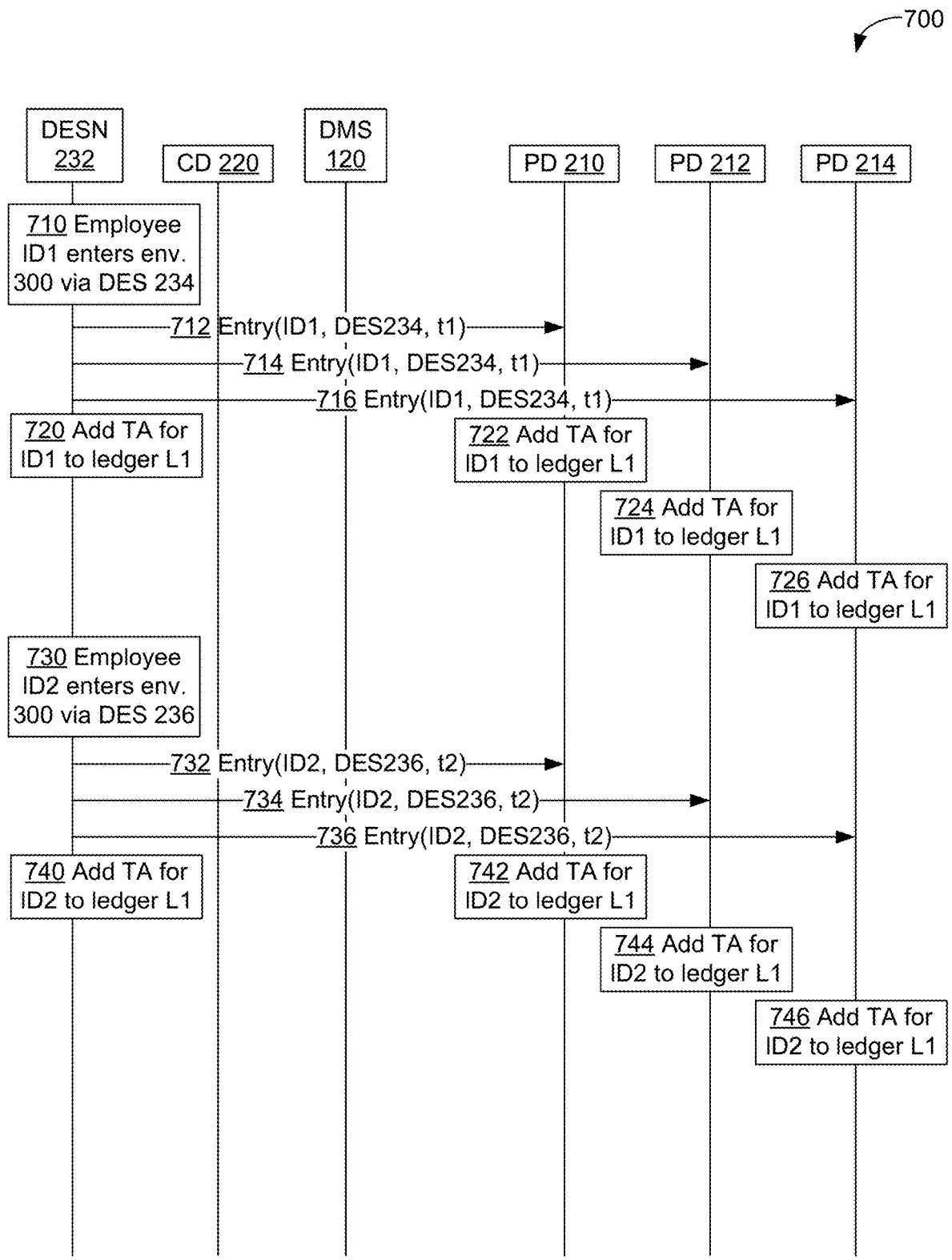
FIGS. 7 and 8 illustrate communications for a scenario for adding trackable actions to a distributed ledger and for querying the distributed ledger, in accordance with at least some example embodiments.
Figure 8:
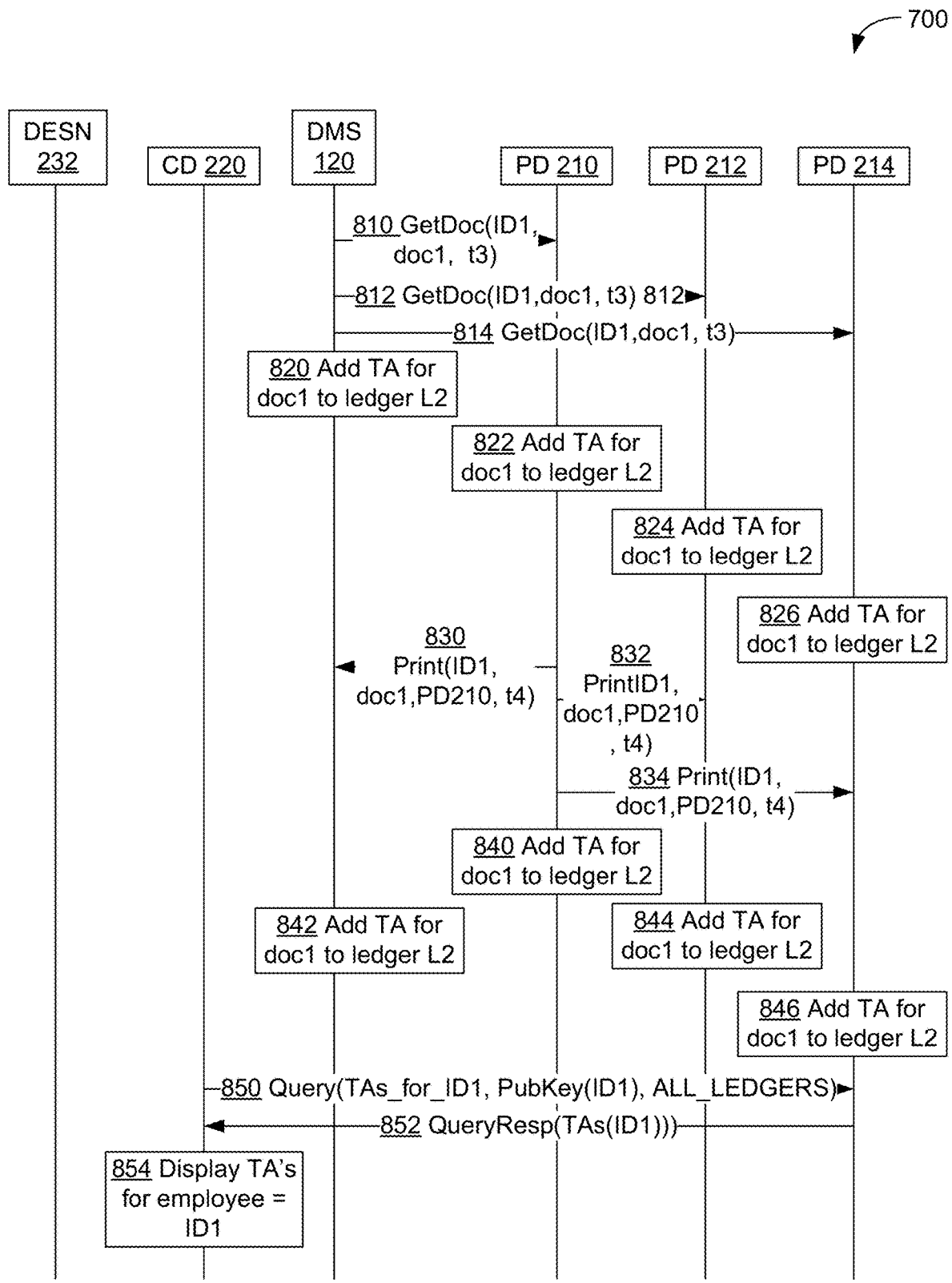

FIGS. 7 and 8 illustrate communications for scenario 700 for adding trackable actions to distributed ledgers L1 and L2 and for querying the distributed ledgers, in accordance with at least some example embodiments. For example, scenario 700 illustrates operations related to methods 500 and 600 performed in environment 300.

Scenario 700 begins with an employee ID1 entering environment 300 via door entry system 234. Upon entry of employee ID1, door entry system node 232 generates a trackable action related to an entry-or-exit transaction for employee ID1 and sends a notification of the transaction to each of printing devices 210, 212, 214. Each of door entry system node 232 and printing devices 210, 212, 214 add the trackable action to a distributed ledger L1 stored by each of printing devices 210, 212, 214 and door entry system node 232.

Scenario 700 continues with an employee ID2 entering environment 300 via door entry system 236. Upon entry of employee ID2, door entry system node 232 generates a trackable action related to an entry-or-exit transaction for employee ID2 and sends a notification of the transaction to each of printing devices 210, 212, 214. Each of door entry system node 232 and printing devices 210, 212, 214 add the trackable action to distributed ledger L1.

Scenario 700 then involves document management system 120 generating a trackable action related to a document-related transaction where employee ID obtains a copy of document doc1. After generating the trackable action related to this document-related transaction, document management system 120 sends a notification of the transaction to each of printing devices 210, 212, 214. Each of document management system 120 and printing devices 210, 212, 214 adds the trackable action to a distributed ledger L2 stored by each of document management system 120 and printing devices 210, 212, 214, where distributed ledger L2 differs from distributed ledger L1.

Scenario 700 proceeds with printing device 210 generating a trackable action related to a printer-related transaction where employee ID1 prints document doc1. After generating the trackable action related to this printer-related transaction, printing device 210 sends a notification of the transaction to each of document management system 120 and printing devices 212, 214. Each of document management system 120 and printing devices 210, 212, 214 adds the trackable action to distributed ledger L2.

Scenario 700 proceeds with computing device 220 generating a query of distributed ledgers L1 and L2 with query criteria requesting information about all trackable actions related to employee ID1, where the query includes a public key associated with employee ID1. Computing device 220 then sends the query to printing device 214, which processes the query and provides information about all trackable actions related to employee ID1 stored in distributed ledgers L1 and L2 back to computing device 220. Upon reception of the information from printing device 214, computing device 220 then generates a display that includes at least part of the information about all trackable actions related to employee ID1 provided by printing device 214. After the display is generated, scenario 700 can be completed.

FIG. 7 shows that scenario 700 begins with employee ID1 entering environment 300 via door entry system 234, as indicated by block 710. Upon entry of employee ID1, door entry system node 232 generates a notification of a trackable action for an entry-or-exit transaction for employee ID1. The notification of the trackable action is sent from door entry system node 232 to each of printing devices 210, 212, 214 as respective Entry messages 712, 714, 716. Each of Entry messages 712, 714, 716 includes an identifier "ID1" of the employee who entered environment 300, an identifier "DES234" indicating that the employee entered via door entry system 234, and a timestamp "t1" indicating a time of entry for the employee.

Scenario 700 continues with each of door entry system node 232 and printing devices 210, 212, 214 adding a trackable action for the entry-or-exit transaction for employee ID1 to distributed ledger L1 as illustrated by respective blocks 720, 722, 724, 726 in FIG. 7. In scenario 700, distributed ledger L1 in stored by each of printing devices 210, 212, 214 and door entry system node 232; thus, each of printing devices 210, 212, 214 and door entry system node 232 store a copy of the entry-or-exit transaction for employee ID1 in their respective copies of distributed ledger L1.

In some examples, some or all of printing devices 210, 212, 214 and door entry system node 232 can execute blocks 510-530 of method 500 to process the notifications of the trackable action represented by Entry messages 712, 714, 716 to store a copy of the entry-or-exit transaction for employee ID1 in their respective copies of distributed ledger L1.

In scenario 700, trackable actions for entry-or-exit transactions of employees are encrypted using a private key for the employee; that is, when each of printing devices 210, 212, 214 and door entry system node 232 stores a copy of the entry-or-exit transaction for employee ID1 in their respective copies of distributed ledger L1, each of printing devices 210, 212, 214 and door entry system node 232 encrypts the copy of the trackable action for entry-or-exit transaction for employee ID1 using a private key for employee ID1 prior to storage in distributed ledger L1. In other scenarios, door entry system 234 and/or door entry system node 232 encrypts a trackable action for entry-or-exit transaction for employee ID1 using the private key for employee ID1; e.g., where the private key for employee ID1 is stored on a badge or other identifier of employee ID1. Then, door entry system node 232 sends the encrypted trackable action for the entry-or-exit transaction for employee ID1 to each of printing devices 210, 212, 214 rather than or along with respective Entry messages 712, 714, 716 so that each of printing devices 210, 212, 214 can store the encrypted trackable action in their respective copies of distributed ledger DL1.

Scenario 700 proceeds with employee ID2 entering environment 300 via door entry system 236, as indicated by block 730. Upon entry of employee ID2, door entry system node 232 generates a notification of a trackable action for an entry-or-exit transaction for employee ID2. The notification of the trackable action is sent from door entry system node 232 to each of printing devices 210, 212, 214 as respective Entry messages 732, 734, 736. Each of Entry messages 732, 734, 736 includes an identifier "ID2" of the employee who entered environment 300, an identifier "DES236" indicating that the employee entered via door entry system 236, and a timestamp "t2" indicating a time of entry for the employee.

Scenario 700 continues with each of door entry system node 232 and printing devices 210, 212, 214 adding a trackable action for the entry-or-exit transaction for employee ID2 to distributed ledger L1 as illustrated by respective blocks 740, 742, 744, 746 in FIG. 7. In some examples, printing devices 210, 212, 214 and door entry system node 232 can execute blocks 510-530 of method 500 to process the notifications of the trackable action represented by Entry messages 732, 734, 736 to store a copy of the entry-or-exit transaction for employee ID2 in their respective copies of distributed ledger L1.

Turning to FIG. 8, document management system 120 generates a trackable action related to a document-related transaction where employee ID obtains a copy of document doc1. After generating the trackable action related to this document-related transaction, document management system 120 sends respective notifications of the document-related transaction as GetDoc messages 810, 812, 814 to each of printing devices 210, 212, 214. FIG. 8 shows data related to the document-related transaction provided in GetDoc messages 810, 812, and 814 that includes an entity (employee) identifier for employee "ID1" that retrieved a document from document management system 120, a document identifier "doc1" for the retrieved document, and a timestamp "t3" indicating a time that the document was retrieved.

Each of document management system 120 and printing devices 210, 212, 214 adds the trackable action for the document-related transaction to a distributed ledger L2 stored by each of document management system 120 and printing devices 210, 212, 214 as illustrated by respective blocks 820, 822, 824, 826 of FIG. 8. In scenario 700, distributed ledger L2 differs from distributed ledger L1—distributed ledger L1 stores trackable actions related to entry and exit transactions, while distributed ledger L2 stores trackable actions related to document-related and printer-related transactions. Also, trackable actions stored in distributed ledger L2 are generally unencrypted, while trackable actions stored in distributed ledger L1 are generally encrypted as indicated above. In some examples, document management system 120 and printing devices 210, 212, 214 can execute blocks 510-530 of method 500 to process the notifications of the trackable action represented by GetDoc messages 810, 812, 814 to store a copy of the document-related transaction for retrieving document doc 1 in their respective copies of distributed ledger L1.

Scenario 700 proceeds with printing device 210 generating a trackable action related to a printer-related transaction where employee ID1 prints document doc1. After generating the trackable action related to this printer-related transaction, printing device 210 sends respective notifications of the document-related transaction as Print messages 830, 832, 834 to respective document management system 120 and printing devices 212, 214. FIG. 8 shows data related to the printer-related transaction provided in Print messages 830, 832, and 834 includes an entity (employee) identifier for employee "ID1" that printed a document, a document identifier "doc1" for the printed document, a device identifier "PD210" corresponding to printing device 210 indicating a device used to print the document, and a timestamp "t4" indicating a time that the document was printed.

Each of document management system 120 and printing devices 210, 212, 214 adds the trackable action for the printer-related transaction to distributed ledger L2 as illustrated by respective blocks 842, 840, 844, 846 of FIG. 8. In some examples, document management system 120 and printing devices 210, 212, 214 can execute blocks 510-530 of method 500 to process the notifications of the trackable action represented by Print messages 830, 832, 834 to store a copy of the printer-related transaction for printing document doc1 in their respective copies of distributed ledger L1.

Scenario 700 proceeds with computing device 220 generating a query of distributed ledgers L1 and L2 with query criteria requesting information about all trackable actions related to employee ID1, where the query includes a public key associated with employee ID1. FIG. 8 shows this query as Query message 850 that includes query criteria "TAs_for_ID1" indicating a request for all trackable actions "TAs" associated with entity employee "ID1", a "PubKey" or public key for entity/employee "ID1", and a query location of "ALL_LEDGERS" indicating that both distributed ledgers DL1 and DL2 (i.e., all of the distributed ledgers of scenario 700) are to be searched while processing Query message 850.

Computing device 220 then sends the Query message 850 to printing device 214, which processes the query using the procedures of method 600 to find trackable actions that satisfy the query criteria of Query message 850; i.e., trackable actions associated with employee ID1. In scenario 700, printing device 214 finds three trackable actions that satisfy the query criteria of Query message 850/are associated with employee ID1: (1) entry of employee ID1 at time t1 as stored in distributed ledger DL1, (2) retrieval of document doc1 at time t3 by employee ID1 as stored in distributed ledger DL2, and (3) printing of document doc1 by employee ID on printing device 210 at time t4 as stored in distributed ledger DL2.

Printing device 214 provides information about the three trackable actions that satisfy the query criteria of Query message 850 by sending QueryResp message 852 to computing device 220. FIG. 8 shows that QueryResp message 852 includes the three trackable actions that satisfy the query criteria of Query message 850 as "TAs(ID1)". Upon reception of the information from printing device 214, computing device 220 then generates a display that includes at least part of the information about the three trackable actions related to employee ID1 provided by printing device 214, as indicated by block 854. After the display associated with block 854 is generated by computing device 220, scenario 700 can be completed.

Figure 9:
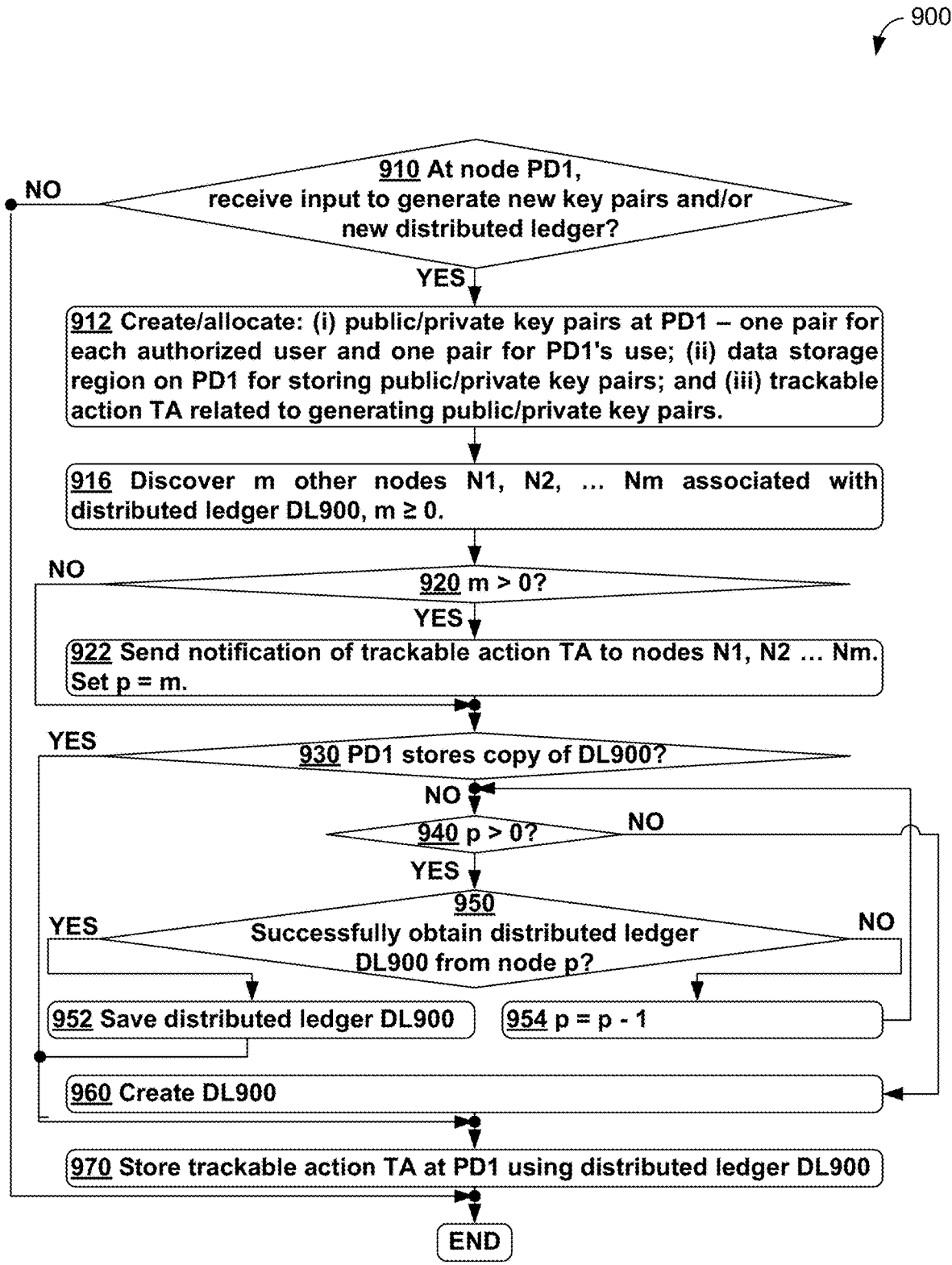
FIG. 9 is a flowchart of another method, in accordance with at least some example embodiments.

FIG. 9 is a flowchart of method 900, in accordance with at least some example embodiments. Method 900 can be used to create a new distributed ledger, illustrated in FIG. 9, as distributed ledger DL900, and related cryptographic keys. Once distributed ledger DL900 and related cryptographic keys have been created, one or more trackable actions can be stored in distributed ledger DL900. Method 900 can be carried out by a computing device acting as a node, such as computing device 100, document management system 120, door entry system node 232, and/or a printing device; e.g., printing device 210, 212, 214, 216.

Method 900 can begin at block 910, where a node PD1 can determine whether PD1 has received an input to generate a new cryptographic key pairs for a distributed ledger and/or to generate a new distributed ledger. Examples of these inputs are firmware updates, factory resets, and commands to generate cryptographic key pairs and/or generate one or more distributed ledgers. If node PD1 does receive an input to generate new cryptographic key pairs for a distributed ledger and/or to generate a new distributed ledger, then node PD1 can proceed to block 912.

Otherwise, node PD1 does not receive an input to generate new cryptographic key pairs for a distributed ledger and/or to generate a new distributed ledger, and node PD1 can exit method 900. In other examples, node PD1 waits for the input to generate new cryptographic key pairs for a distributed ledger and/or to generate a new distributed ledger rather than exiting method 900.

At block 912, node PD1 can create one or more cryptographic keys, including but not limited to, one public/private key pair for each authorized user of node PD1 and/or at least one public/private key pair for the node PD1. Node PD1 can also allocate data storage for storing the created cryptographic keys. Node PD1 can further create a trackable action TA associated with generating the one or more cryptographic keys; e.g., the public/private keys for authorized users and the node PD1. In some cases, the trackable action TA can include some or all of the created keys; e.g., some or all of the public keys of created public/private key pairs. In other cases, the trackable action TA can include references to some or all of the created keys; e.g., a reference to a public key of a public/private key pair so that the public key can be later retrieved or otherwise referred to using the reference provided in trackable action TA.

In even other cases, trackable action TA can be encrypted; e.g., using a private key of a public/private key pair for node PD1. Then, trackable action TA can be decrypted using the public key for the public/private key pair for node PD1. In particular of these cases, the public key for the public/private key pair for node PD1 can be distributed using an unencrypted portion of trackable action TA and/or distributed using a message or other data distinct from trackable action TA.

At block 916, node PD1 can discover m other nodes N1, N2 . . . Nm associated with distributed ledger DL900, where m≥0. For example, node PD1 can query a fleet management system to determine nodes associated with distributed ledger DL900, where the fleet management system stores information about nodes associated with one or more distributed ledges. In response to the query, the fleet management system can send information about the nodes associated with distributed ledger DL900; e.g., network address, device identification, and/or other communication-related information about the nodes. As another example, node PD1 can send a discovery (or other) message to each of one or more other computing devices to determine whether a computing device is a node for distributed ledger DL900. In response to the discovery, the computing device can either respond affirmatively and provide information, e.g., network address, device identification, and/or other communication-related information, about other nodes for distributed ledger DL900, or respond negatively to inform node PD1 that the computing device is not a node for distributed ledger DL900. Other discovery techniques are possible as well.

In some examples, upon discovering m>0 other nodes N1, N2 . . . Nm associated with distributed ledger DL900, then node PD1 can create and/or update a node communication list (or other data structure). The node communication list can store information about the nodes associated with distributed ledger DL900; e.g., the list can store network address, device identification, and/or other communication-related information about the nodes and information about distributed ledger(s) associated with the nodes. Then, if node PD1 receives a discovery message or other query about nodes associated with distributed ledger DL900 and/or if node PD1 wishes to communicate with some or all of the other nodes N1, N2, . . . Nm associated with distributed ledger DL900, then node PD1 can obtain information to communicate with the other nodes N1, N2, . . . Nm from the node communication list.

At block 920, node PD1 can determine whether m is greater than 0, where m is the number of other nodes discovered at block 916. If m is greater than 0, then node PD1 can proceed to block 922. Otherwise, m is less than or equal to 0, and node PD1 can proceed to block 930.

At block 922, node PD1 can send notification of trackable action TA to the m other nodes N1, N2 . . . Nm discovered at block 916. Also at block 922, node PD1 can set a value p equal to m; that is, p is initially set to the number of nodes discovered at block 916.

At block 930, node PD1 can determine whether node PD900 stores a copy of distributed ledger DL1. If node PD1 stores a copy of distributed ledger DL900, then node PD1 can proceed to block 970. Otherwise, node PD1 does not store a copy of distributed ledger DL900 and node PD1 can proceed to block 940.

At block 940, node PD1 can determine whether p is greater than 0. If p is greater than 0, then node PD1 can proceed to block 950. Otherwise, p is less than or equal to 0, and node PD1 can proceed to block 960.

At block 950, node PD1 can attempt to obtain a copy of distributed ledger DL900 from node p. Then, node PD1 can determine whether node PD1 successfully obtained a copy of distributed ledger DL900. If node PD1 did successfully obtain a copy of distributed ledger DL900, then node PD1 can proceed to block 952. Otherwise, node PD1 did not successfully obtain a copy of distributed ledger DL900 and node PD1 can proceed to block 954.

At block 952, node PD1 can save the obtained copy of distributed ledger DL900; e.g., in the data storage allocated for storing distributed ledgers and/or cryptographic keys mentioned in the context of block 912. After saving the obtained copy of distributed ledger DL900, node PD1 can proceed to block 970.

At block 954, node PD1 can decrement p; that is, set p to a value equal to p−1. After decrementing p, node PD1 can proceed to block 940.

At block 960, node PD1 can create a new distributed ledger as DL900. For example, node PD1 can generate a new origin block that is the same as or similar to block 410 of ledger 400 and thereby create new distributed ledger DL900.

At block 970, node PD1 can store trackable action TA using distributed ledger DL900; that is, node PD1 can add trackable action TA to distributed ledger DL900. In some examples, node PD1 can use some or all of the procedures of method 500 to store trackable action TA, and perhaps additional trackable actions, using distributed ledger DL900. After completing the procedures of block 970, method 900 can be completed.

IV. Example Methods of Operation

Figure 10:
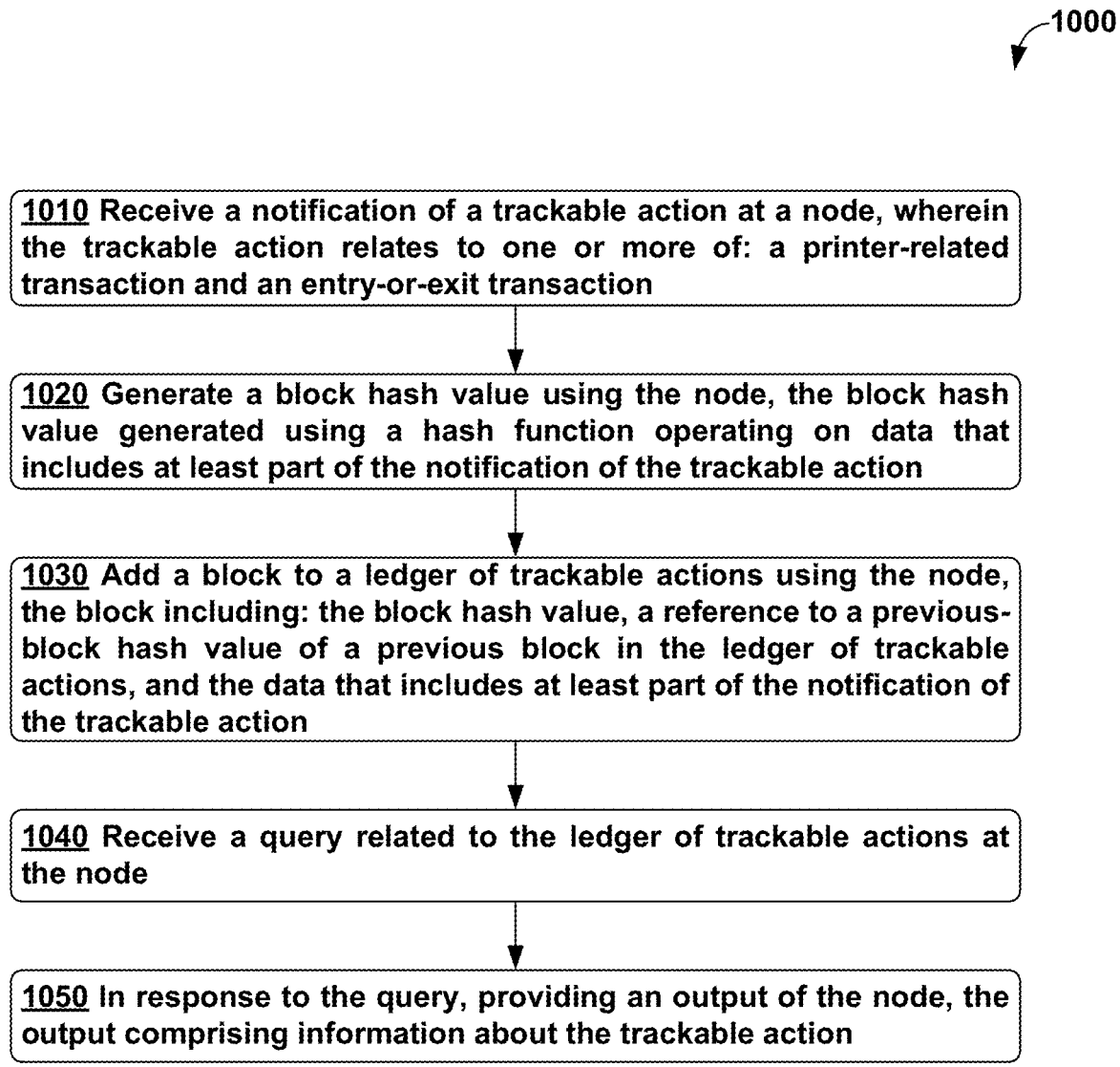
FIG. 10 is a flowchart of another method, in accordance with at least some example embodiments.

FIG. 10 is a flowchart of method 1000, in accordance with at least some example embodiments. Method 1000 can be carried out by a computing device acting as a node, such as computing device 100, document management system 120, door entry system node 232, and/or a printing device; e.g., printing device 210, 212, 214, 216. Method 1000 can begin at block 1010, where the node can receive a notification of a trackable action, where the trackable action relates to one or more of: a printer-related transaction and an entry-or-exit transaction, such as discussed herein in the context of at least FIGS. 5, 7, 8, and 9.

In some embodiments, the printer-related transaction can include one or more of: a transaction related to printing a document, a transaction related to scanning a document, and a transaction related to communicating a document using a printing device, such as discussed herein in the context of at least FIGS. 5, 7, and 8. In other embodiments, the printer-related transaction can include one or more of: a transaction related to maintaining colorant of a printing device, a transaction related to firmware of a printing device, a transaction related to changing an organization associated with a printing device, a transaction related to one or more counters of a printing device, and a transaction related to changing information used to control and/or identify a printing device, such as discussed herein in the context of at least FIGS. 5, 7, and 8. In even other embodiments, the entry-or-exit transaction can include one or more of: a transaction related to an entry of an entity into a secured area and a transaction related to an exit of the entity from a secured area, such as discussed herein in the context of at least FIGS. 5, 7, and 8. In some of these embodiments, the node can be associated with an organization that utilizes a building which includes the secured area, and where the entity includes an employee of the organization, such as discussed herein in the context of at least FIGS. 5, 7, and 8.

In still other embodiments, the trackable action further relates to one or more document-related transactions, such as discussed herein in the context of at least FIGS. 5, 7, and 8. In some of these embodiments, the one or more document-related transactions include: a transaction related to a particular document, a transaction related to one or more documents associated with a particular entity, a transaction related to one or more documents associated with a particular node, a transaction related to one or more documents associated with a particular network address, and a transaction related to one or more documents associated with a particular geographical location, such as discussed herein in the context of at least FIGS. 5, 7, and 8. In yet other embodiments, the node is configured as one or more of: a printing device and a door entry system, such as discussed herein in the context of at least FIGS. 5, 7, and 8.

At block 1020, the node can generate a block hash value using a hash function operating on data that includes at least part of the notification of the trackable action, such as discussed herein in the context of at least FIGS. 4, 5, 6, 7, and 8.

At block 1030, the node can add a new block to a ledger of trackable actions, the new block including: the block hash value, a reference to a previous-block hash value of a previous block in the ledger of trackable actions, and the data that includes at least part of the notification of the trackable action, such as discussed herein in the context of at least FIGS. 4, 5, 6, 7, and 8.

In some embodiments, the node can be at least one of a plurality of nodes, and where adding the new block to the ledger of trackable actions includes: sending a message about the new block to one or more other nodes in the plurality of nodes, such as discussed herein in the context of at least FIGS. 3, 5, 6, 7, and 8. In particular of these embodiments, the node is associated with a first organization, and the plurality of nodes are associated with a plurality of organizations that include the first organization; then, sending the message to one or more other nodes in the plurality of nodes can include sending the message only to one or more other nodes in the plurality of nodes that are also associated with the first organization, such as discussed herein in the context of at least FIGS. 3 and 5.

At block 1040, the node can receive a query related to the ledger of trackable actions at the node, such as discussed herein in the context of at least FIGS. 6, 7, and 8.

At block 1050, the node can, in response to the query, provide an output that includes information about the trackable action, such as discussed herein in the context of at least FIGS. 6, 7, and 8.

In some embodiments, the output of the node can include one or more of: information about a document printed using a node, information related to a document scanned using a node, information about a document that was communicated using a node, information related to maintaining colorant of a node, information related to firmware of a node, information related to an organization associated with a node, information related to one or more counters for a node, and information related to information used to control and/or identify a node, such as discussed herein in the context of at least FIGS. 6, 7, and 8. In other embodiments, the output of the node can include one or more of: information about an entry of an entity into a secured area and information about an exit of an entity from a secured area, such as discussed herein in the context of at least FIGS. 6, 7, and 8. In even other embodiments, the output of the node can include one or more of: information about a specific document, information about one or more documents associated with a particular entity, information about one or more documents associated with a particular node, information related to one or more documents associated with a particular network address, and information related to one or more documents associated with a particular geographical location, such as discussed herein in the context of at least FIGS. 6, 7, and 8.

In some embodiments, method 1000 can further include: creating one or more key pairs at a node, each key pair including a public key and a private key; and determining a particular key pair of the one or more key pairs that is associated with the trackable action, such as discussed herein in the context of at least FIG. 9. In particular embodiments, the trackable action can be encrypted using a private key of the particular key pair, such as discussed herein in the context of at least FIGS. 7-9.

V. Deploying Multiple Nodes for Blockchains

In the same ways that TCP/IP changed the way that devices communicate and perform tasks, the decentralization of ledgers using blockchain technology can change how records of work are maintained. Herein are described techniques for allowing existing devices to become functioning nodes, en masse, for the creation of a private blockchain or distributed ledger, as well as the possible addition of nodes to an existing blockchain. These techniques can be used to create networks of nodes to create and maintain (private) blockchains/distributed ledgers. These blockchains/distributed ledgers can then be used to securely and redundantly store trackable actions, and perhaps other data.

In particular, fleet management software can be used to deploy a firmware update that creates new partitions on devices coded specifically to store blockchain specific information. The new partitions can enable storage blockchain specific information on full node clients (devices with persistent storage, such as flash storage, electrically erasable programmable read-only memory (EEPROM), and magnetic media such as hard drives) and/or half node clients (devices without persistent storage). The blockchain specific information can be information about one or more existing blockchains, new blockchains, public blockchains, and/or private blockchains.

The fleet management system can establish a private blockchain with devices of a fleet of nodes by providing a firmware update to each node. The firmware update can include a script (or other software) executed on each device receiving and installing the firmware update. The script, when executed, can create a private/public key pair for each authorized user of the device and/or one key pair for the device. The key pairs created during the firmware update can be used to encrypt and decrypt trackable actions. In some cases, a trackable action is encrypted either with an authorized user's private key or a device's private key. The script can create a new partition for the key pair(s) and stores the key pair(s) in the new partition.

An encrypted or unencrypted trackable action can be broadcast/sent to a network of nodes, as indicated above in the context of at least method 500 and scenario 700. To perform this broadcast, a device generating the trackable action can first discover other nodes of the blockchain/distributed ledger that stores the trackable action. Then, upon discovery of these other nodes, the device generating the trackable action can broadcast the encrypted or unencrypted trackable action to the discovered other nodes.

Each full node client can query the fleet management system to discover the other nodes of a blockchain/distributed ledger. In some cases, half node clients may also attempt to discover other nodes in the blockchain.

The fleet management system can maintain one or more lists (and/or other data structures) of nodes associated with one or more blockchains/distributed ledgers. Then, to discover other nodes, a full node client can query the fleet management system about nodes of a blockchain/distributed ledger (or blockchains/distributed ledgers) that the full node client is to maintain. The fleet management system can respond to the query by providing the full node client with information about nodes of the queried blockchain/distributed ledger (or blockchains/distributed ledgers) stored in the list(s).

In operation, the fleet management system can first provide a firmware update or other software update UPD1 to one or more devices, such as printing devices, door entry system nodes, and/or document management systems, that will act as nodes to maintain a blockchain/distributed ledger BC/DL1. Upon reception of firmware/software update UPD1 at a device D, the device D can install firmware and/or other software in UPD1. Also, device D can execute a script SCR1 that is part of UPD1, where SCR1 can allocate and/or create storage at least for blockchain/distributed ledger BC/DL1 and cryptographic keys associated with BC/DL1. Then, script SCR1 can create a private/public cryptographic key pair for each authorized user of device D and/or at least one cryptographic key pair associated with device D and can store the cryptographic keys in the storage for BC/DL1. Also, the fleet management system can update a list (or other data structure) L1 associating devices to blockchains/distribute ledgers to include a record that the one or more devices receiving update UPD1 are associated with blockchain/distributed ledger BC/DL1. Then, the devices receiving update UPD1 can discover other nodes associated with blockchain/distributed ledger BC/DL1 by querying the fleet management system to obtain information about the other nodes from the list L1. The fleet management system can respond to such queries by providing information stored in list L1 about nodes associated with blockchain/distributed ledger BC/DL1. After discovery, the nodes can create and maintain the blockchain/distributed ledger BC/DL1; e.g., using the techniques discussed above such as methods 500, 600, 900, and 1000 and techniques discussed above in the context of scenario 700.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for managing a printer-related transaction on a plurality of printing devices in a plurality of secured areas, comprising:
   receiving a plurality of notifications of trackable actions at a node that is one of a plurality of nodes, wherein the trackable actions include a first trackable action relating to a printer-related transaction and a second trackable action relating to an entry-or-exit transaction, wherein receiving the plurality of notifications of trackable actions comprises:
      receiving, from at least one of a plurality of door entry system nodes, an entry notification for an entry transaction, wherein the entry notification identifies an entity entering at least one of the plurality of secured areas, and wherein each of the plurality of door entry system nodes is associated with one of the plurality of the secured areas and is one of the plurality of nodes;
      receiving, from at least one of the plurality of printing devices, a printer-related notification of a printer-related transaction associated with the identified entity, wherein the printer-related transaction comprises one or more of: a transaction related to printing a document, a transaction related to scanning a document, and a transaction related to communicating a document using a printing device, wherein the document is managed by a document management system that is one of the plurality of nodes, and wherein each of the plurality of printing devices is one of the plurality of nodes; and
      receiving, from at least one of a plurality of door entry system nodes, an exit notification for an exit transaction, wherein the exit notification identifies the entity having exited the at least one of the plurality of secured areas;
   generating a block hash value using the node, the block hash value generated using a hash function operating on data that includes at least part of the notifications of the trackable actions;
   adding a new block to a ledger of trackable actions using the node, the new block including: the block hash value, a reference to a previous-block hash value of a previous block in the ledger of trackable actions, and the data that includes at least part of the notifications of the trackable actions;
   receiving a query related to the ledger of trackable actions at the node; and
   in response to the query, providing an output of the node, the output comprising information about the trackable actions.

2. The method of claim 1, wherein the node is at least one of a plurality of nodes, and wherein adding the new block to the ledger of trackable actions comprises:
   sending a message about the new block to one or more other nodes in the plurality of nodes.

3. The method of claim 2, wherein the node is associated with a first organization, and wherein the plurality of nodes are associated with a plurality of organizations that include the first organization, and wherein sending the message to one or more other nodes in the plurality of nodes comprises sending the message only to one or more other nodes in the plurality of nodes that are also associated with the first organization.

4. The method of claim 1, wherein the printer-related transaction comprises one or more of: a transaction related to maintaining colorant of a printing device, a transaction related to firmware of a printing device, a transaction related to changing an organization associated with a printing device, a transaction related to one or more counters of a printing device, and a transaction related to changing information used to control and/or identify a printing device.

5. The method of claim 1, wherein the node is associated with an organization that utilizes a building which includes the at least one of the plurality of secured areas, and wherein the entity comprises an employee of the organization.

6. The method of claim 1, wherein the output of the node comprises one or more of:
   information about a document printed using a node, information related to a document scanned using a node, information about a document that was communicated using a node, information related to maintaining colorant of a node, information related to firmware of a node, information related to an organization associated with a node, information related to one or more counters for a node, and information related to information used to control and/or identify a node.

7. The method of claim 1, wherein the output of the node comprises one or more of: information about an entry of an entity into a secured area and information about an exit of an entity from a secured area.

8. The method of claim 1, wherein the trackable actions further include a third trackable action relating to a document-related transaction, and wherein receiving the plurality of notifications of trackable actions further comprises receiving, from the document management system, a notification of a document-related transaction associated with the identified entity.

9. The method of claim 8, wherein the document-related transaction comprises one or more of: a transaction related to a particular document, a transaction related to one or more documents associated with a particular entity, a transaction related to one or more documents associated with a particular node, a transaction related to one or more documents associated with a particular network address, and a transaction related to one or more documents associated with a particular geographical location.

10. The method of claim 8, wherein the output of the node comprises one or more of: information about a specific document, information about one or more documents associated with a particular entity, information about one or more documents associated with a particular node, information related to one or more documents associated with a particular network address, and information related to one or more documents associated with a particular geographical location.

11. The method of claim 1, wherein the plurality of nodes are comprised of at least one each of a printing device, a door entry system, and the document management system.

12. The method of claim 1, further comprising:
creating one or more key pairs at a node, each key pair comprising a public key and a private key; and
determining a particular key pair of the one or more key pairs that is associated with at least one of the trackable actions.

13. The method of claim 12, wherein the at least one trackable action is encrypted using a private key of the particular key pair.

14. A node for managing a printer-related transaction on a plurality of printing devices in a plurality of secured areas, comprising:
one or more processors; and
data storage configured to store computer-readable instructions that, when executed by the one or more processors, cause the node to perform tasks comprising:
receiving a plurality of notifications of trackable actions, wherein the trackable actions include a first trackable action relating to a printer-related transaction and a second trackable action relating to an entry-or-exit transaction, wherein receiving the plurality of notifications of trackable actions comprises at least three of the following:
receiving, from at least one of a plurality of door entry system nodes, an entry notification for an entry transaction, wherein the entry notification identifies an entity entering at least one of the plurality of secured areas, and wherein each of the plurality of door entry system nodes is associated with one of the plurality of the secured areas and is one of the plurality of nodes;
receiving, from at least one of the plurality of printing devices, a printer-related notification of a printer-related transaction associated with the identified entity, wherein the printer-related transaction comprises one or more of: a transaction related to printing a document, a transaction related to scanning a document, and a transaction related to communicating a document using a printing device, wherein the document is managed by a document management system that is one of the plurality of nodes, and wherein each of the plurality of printing devices is one of the plurality of nodes;
receiving, from the document management system, a notification of a document-related transaction associated with the identified entity; and
receiving, from at least one of a plurality of door entry system nodes, an exit notification for an exit transaction, wherein the exit notification identifies the entity having exited the at least one of the plurality of secured areas;
generating a block hash value using a hash function operating on data that includes at least part of the notifications of the trackable actions;
adding a new block to a ledger of trackable actions, the new block including: the block hash value, a reference to a previous-block hash value of a previous block in the ledger of trackable actions, and the data that includes at least part of the notifications of the trackable actions;
receiving a query related to the ledger of trackable actions; and
in response to the query, providing an output comprising information about the trackable actions.

15. The node of claim 14, wherein the node is one of a plurality of nodes comprised of at least one each of a printing device, a door entry system, and a document management system.

16. The node of claim 14, wherein the node is at least one of a plurality of nodes, and wherein adding the new block to the ledger of trackable actions comprises:
sending a message about the new block to one or more other nodes in the plurality of nodes.

17. The node of claim 16, wherein the node is associated with a first organization, and wherein the plurality of nodes are associated with a plurality of organizations that include the first organization, and wherein sending the message to one or more other nodes in the plurality of nodes comprises sending the message only to one or more other nodes in the plurality of nodes that are also associated with the first organization.

18. An article of manufacture comprising non-transitory data storage storing at least computer-readable instructions for a node that, when executed by one or more processors of a node, cause the node to perform tasks comprising:
receiving a plurality of notifications of trackable actions, wherein the trackable actions include a first trackable action relating to a printer-related transaction and a second trackable action relating to an entry-or-exit transaction, wherein receiving the plurality of notifications of trackable actions comprises at least three of the following:
receiving, from at least one of a plurality of door entry system nodes, an entry notification for an entry transaction, wherein the entry notification identifies an entity entering at least one of the plurality of secured areas, and wherein each of the plurality of door entry system nodes is associated with one of the plurality of the secured areas and is one of the plurality of nodes;
receiving, from at least one of the plurality of printing devices, a printer-related notification of a printer-related transaction associated with the identified entity, wherein the printer-related transaction comprises one or more of: a transaction related to printing a document, a transaction related to scanning a document, and a transaction related to communicating a document using a printing device, wherein the document is managed by a document management system that is one of the plurality of nodes, and wherein each of the plurality of printing devices is one of the plurality of nodes;

receiving, from the document management system, a notification of a document-related transaction associated with the identified entity; and receiving, from at least one of a plurality of door entry system nodes, an exit notification for an exit transaction, wherein the exit notification identifies the entity having exited the at least one of the plurality of secured areas;

generating a block hash value using a hash function operating on data that includes at least part of the notifications of the trackable actions;

adding a new block to a ledger of trackable actions, the new block including: the block hash value, a reference to a previous-block hash value of a previous block in the ledger of trackable actions, and the data that includes at least part of the notifications of the trackable actions;

receiving a query related to the ledger of trackable actions; and in response to the query, providing an output comprising information about the trackable actions.

* * * * *